(12) United States Patent
Tajima et al.

(10) Patent No.: US 9,401,247 B2
(45) Date of Patent: Jul. 26, 2016

(54) NEGATIVE ELECTRODE FOR POWER STORAGE DEVICE AND POWER STORAGE DEVICE

(75) Inventors: Ryota Tajima, Kanagawa (JP); Shunpei Yamazaki, Tokyo (JP); Hideomi Suzawa, Kanagawa (JP); Takeshi Osada, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 166 days.

(21) Appl. No.: 13/613,874

(22) Filed: Sep. 13, 2012

(65) Prior Publication Data

US 2013/0071739 A1 Mar. 21, 2013

(30) Foreign Application Priority Data

Sep. 21, 2011 (JP) ................... 2011-206054

(51) Int. Cl.
| | |
|---|---|
| *H01M 4/02* | (2006.01) |
| *H01M 4/13* | (2010.01) |
| *H01G 11/30* | (2013.01) |
| *B82Y 30/00* | (2011.01) |
| *H01M 4/62* | (2006.01) |
| *H01M 4/134* | (2010.01) |
| *H01M 4/38* | (2006.01) |
| *H01G 11/26* | (2013.01) |
| *H01G 11/66* | (2013.01) |
| *H01M 10/0525* | (2010.01) |

(52) U.S. Cl.
CPC ............... *H01G 11/30* (2013.01); *B82Y 30/00* (2013.01); *H01G 11/26* (2013.01); *H01G 11/66* (2013.01); *H01M 4/13* (2013.01); *H01M 4/134* (2013.01); *H01M 4/386* (2013.01); *H01M 4/62* (2013.01); *H01M 4/625* (2013.01); *H01M 10/0525* (2013.01); *Y02E 60/122* (2013.01); *Y02E 60/13* (2013.01); *Y02P 70/54* (2015.11); *Y02T 10/7011* (2013.01); *Y02T 10/7022* (2013.01)

(58) Field of Classification Search
None
See application file for complete search history.

(56) References Cited

U.S. PATENT DOCUMENTS

| 4,628,015 A | 12/1986 | Yata et al. |
| 5,641,591 A * | 6/1997 | Kawakami et al. ........ 429/231.5 |

(Continued)

FOREIGN PATENT DOCUMENTS

| CN | 001599099 A | 3/2005 |
| CN | 101107746 A | 1/2008 |

(Continued)

OTHER PUBLICATIONS

Gangloff et al., "Self-Aligned, Gated Arrays of Individual Nanotube and Nanowire Emitters", Nano Letters, Sep. 1, 2004, vol. 4, No. 9, pp. 1575-1579.

(Continued)

*Primary Examiner* — Patrick Ryan
*Assistant Examiner* — Jose Colucci Rios
(74) *Attorney, Agent, or Firm* — Nixon Peabody LLP; Jeffrey L. Costellia

(57) ABSTRACT

Provided is a negative electrode for a power storage device in which charge/discharge capacity is high and deterioration in battery characteristics due to charge/discharge is small. The negative electrode for a power storage device includes a negative electrode active material having a plurality of protrusions and a bar which serves as a connecting bridge over a first protrusion and a second protrusion among the plurality of protrusions. The bar is provided in a direction perpendicular to a direction in which a current collector is bent. An axis of the first protrusion and an axis of the second protrusion are oriented in the same direction. Further, a graphene covering a side surface of the protrusion or covering the side surface of the protrusion and a top surface of the bar may be provided.

21 Claims, 17 Drawing Sheets

(56) References Cited

U.S. PATENT DOCUMENTS

| | | |
|---|---|---|
| 6,685,804 B1 | 2/2004 | Ikeda et al. |
| 6,887,511 B1 | 5/2005 | Shima et al. |
| 7,015,496 B2 | 3/2006 | Ohnuma et al. |
| 7,147,971 B2 | 12/2006 | Okamoto et al. |
| 7,192,673 B1 | 3/2007 | Ikeda et al. |
| 7,195,842 B1 | 3/2007 | Fujimoto et al. |
| 7,235,330 B1 | 6/2007 | Fujimoto et al. |
| 7,241,533 B1 | 7/2007 | Ikeda et al. |
| 7,368,306 B2 | 5/2008 | Ohnuma et al. |
| 7,396,409 B2 | 7/2008 | Hatta et al. |
| 7,402,829 B2 | 7/2008 | Green |
| 7,410,728 B1 | 8/2008 | Fujimoto et al. |
| 7,432,010 B2 | 10/2008 | Dokko |
| 7,521,151 B2 | 4/2009 | Hwang et al. |
| 7,592,099 B2 | 9/2009 | Tamura et al. |
| 7,794,878 B2 | 9/2010 | Kogetsu et al. |
| 7,794,881 B1 | 9/2010 | Fujimoto et al. |
| 7,923,148 B2 | 4/2011 | Yamamoto et al. |
| 8,003,257 B2 | 8/2011 | Takeuchi et al. |
| 8,076,027 B2 | 12/2011 | Honda et al. |
| 8,470,476 B2 | 6/2013 | Yamamoto et al. |
| 9,011,702 B2 | 4/2015 | Yamazaki et al. |
| 2002/0122985 A1 | 9/2002 | Sato et al. |
| 2003/0001150 A1* | 1/2003 | Iwasaki et al. .................. 257/3 |
| 2005/0064291 A1 | 3/2005 | Sato et al. |
| 2007/0059584 A1 | 3/2007 | Nakano et al. |
| 2007/0131915 A1 | 6/2007 | Stankovich et al. |
| 2007/0166613 A1 | 7/2007 | Kogetsu et al. |
| 2008/0153000 A1 | 6/2008 | Salot et al. |
| 2008/0220337 A1 | 9/2008 | Kawase et al. |
| 2008/0297981 A1 | 12/2008 | Endo et al. |
| 2009/0017380 A1* | 1/2009 | Honda et al. ............ 429/218.1 |
| 2009/0042097 A1* | 2/2009 | Fujikawa et al. ............ 429/129 |
| 2009/0104515 A1 | 4/2009 | Fujikawa et al. |
| 2009/0110627 A1 | 4/2009 | Choi et al. |
| 2009/0117467 A1 | 5/2009 | Zhamu et al. |
| 2009/0123850 A1 | 5/2009 | Takeuchi et al. |
| 2010/0021819 A1 | 1/2010 | Zhamu et al. |
| 2010/0078591 A1 | 4/2010 | Sano et al. |
| 2010/0081057 A1 | 4/2010 | Liu et al. |
| 2010/0151329 A1 | 6/2010 | Sato et al. |
| 2010/0176337 A1 | 7/2010 | Zhamu et al. |
| 2010/0209784 A1 | 8/2010 | Yamazaki et al. |
| 2010/0216026 A1 | 8/2010 | Lopatin et al. |
| 2010/0216054 A1* | 8/2010 | Kouassi ..................... 429/517 |
| 2010/0227228 A1 | 9/2010 | Yamazaki et al. |
| 2010/0233538 A1 | 9/2010 | Nesper et al. |
| 2010/0233546 A1 | 9/2010 | Nesper et al. |
| 2010/0291438 A1 | 11/2010 | Ahn et al. |
| 2010/0308277 A1 | 12/2010 | Grupp |
| 2011/0003199 A1* | 1/2011 | Yamamura et al. ............ 429/188 |
| 2011/0020706 A1 | 1/2011 | Nesper |
| 2011/0070146 A1 | 3/2011 | Song et al. |
| 2011/0073561 A1* | 3/2011 | Yamazaki et al. ............ 216/13 |
| 2011/0111299 A1 | 5/2011 | Liu et al. |
| 2011/0121240 A1 | 5/2011 | Amine et al. |
| 2011/0133131 A1 | 6/2011 | Zhou et al. |
| 2011/0151290 A1 | 6/2011 | Cui et al. |
| 2011/0183203 A1 | 7/2011 | Du et al. |
| 2011/0227000 A1 | 9/2011 | Ruoff et al. |
| 2011/0266654 A1 | 11/2011 | Kuriki et al. |
| 2011/0269016 A1 | 11/2011 | Takeuchi et al. |
| 2011/0294005 A1 | 12/2011 | Kuriki et al. |
| 2012/0003383 A1 | 1/2012 | Furuno |
| 2012/0045692 A1 | 2/2012 | Takemura et al. |
| 2012/0058397 A1 | 3/2012 | Zhamu et al. |
| 2012/0088151 A1 | 4/2012 | Yamazaki et al. |
| 2012/0088156 A1 | 4/2012 | Nomoto et al. |
| 2013/0071751 A1 | 3/2013 | Tajima et al. |
| 2013/0084495 A1 | 4/2013 | Tajima et al. |
| 2013/0084496 A1 | 4/2013 | Osada et al. |

FOREIGN PATENT DOCUMENTS

| | | |
|---|---|---|
| CN | 101924211 A | 12/2010 |
| CN | 101981733 A | 2/2011 |
| CN | 102034969 A | 4/2011 |
| CN | 102064322 A | 5/2011 |
| JP | 06-060870 | 3/1994 |
| JP | 2000-277146 | 10/2000 |
| JP | 2001-210315 | 8/2001 |
| JP | 2001-283834 | 10/2001 |
| JP | 2002-063894 | 2/2002 |
| JP | 2002-164556 | 6/2002 |
| JP | 2003-246700 | 9/2003 |
| JP | 2003-258285 | 9/2003 |
| JP | 2004-281317 | 10/2004 |
| JP | 2005-108521 | 4/2005 |
| JP | 2006-080450 | 3/2006 |
| JP | 2007-299580 | 11/2007 |
| JP | 2007-308774 | 11/2007 |
| JP | 2008-257894 | 10/2008 |
| JP | 2010-129332 | 6/2010 |
| JP | 2010-135332 | 6/2010 |
| JP | 2010-219030 | 9/2010 |
| JP | 2010-219392 | 9/2010 |
| JP | 2010-239122 | 10/2010 |
| JP | 2010-250968 A | 11/2010 |
| JP | 2010-262860 A | 11/2010 |
| JP | 2011-029184 | 2/2011 |
| JP | 2011-048992 | 3/2011 |
| WO | WO-2006/080265 | 8/2006 |
| WO | WO 2007-004728 A1 | 1/2007 |
| WO | WO-2009/125272 | 10/2009 |

OTHER PUBLICATIONS

Blake et al., "Graphene-Based Liquid Crystal Device", Nano Letters, Apr. 30, 2008, vol., 8, No. 6, pp. 1704-1708.

English Translation of "Graphene: Functions and Application", Jul. 31, 2009, pp. 171-172, CMC Publishing Co., Ltd.

Kamins et al., "TI-Catalyzed SI Nanowires by Chemical Vapor Deposition: Microscopy and Growth Mechanisms", Journal of Applied Physics, Jan. 15, 2001, vol. 89, No. 2, pp. 1008-1016.

Thomas et al., "Cathodoluminescent Field Emission Flat Panel Display Prototype Built Using Arrays of Diamond-Coated Silicon Tips", Sid Digest, '98, Sid International Symposium Digest of Technical Papers, May 1, 1998, vol. 29, pp. 577-581.

Leu et al., "Chemical Vapor Deposition of Silicon Carbide Whiskers Activated by Elemental Nickel", Journal of the Electrochemical Society, 1999, vol. 146, No. 1, pp. 184-188.

Pedraza et al., "Silicon Microcolumn Arrays Grown by Nanosecond Pulsed-Excimer Laser Irradiation", Applied Physics Letter, Apr. 19, 1999, vol. 74, No. 16, pp. 2322-2324.

Kohno et al., "Silicon Nanoneedles Grown by a Simple Thermal Treatment Using Metal-Sulfur Catalysts", Japanese Journal of Applied Physics,.Feb. 1, 2002, vol. 41, No. 2A, pp. 577-578.

Cui et al., "Crystalline-Amorphous Core-Shell Silicon Nanowires For High Capacity and High Current Battery Electrodes", Nano Letters, 2009, vol. 9, No. 1, pp. 491-495.

Yonezawa et al., "Fabrication of Graphene Oxide Membrane by Electrophoretic Deposition", Proceedings of the 57th Spring Meeting, The Japan Society of Applied Physics and Related Societies, Mar. 17, 2010, pp. 17-040.

Oguni et al., U.S. Appl. No. 13/483,297, As-filed, Specification, Claims, Abstract, Drawings, Official Filling Receipt, filed on May 30, 2012, (Not Published).

Zhou.X et al., "Graphene modified LiFePO4 cathode materials for high power lithium ion batteries", J. Mater. Chem. (Journal of Materials Chemistry), 2011, vol. 21, pp. 3353-3358.

Chinese Office Action (Application No. 201210350552.6) Dated Oct. 28, 2015.

* cited by examiner

NEGATIVE ELECTRODE FOR POWER STORAGE DEVICE AND POWER STORAGE DEVICE

BACKGROUND OF THE INVENTION

1. Field of the Invention

The present invention relates to a negative electrode of a power storage device and a power storage device.

2. Description of the Related Art

In recent years, energy storage devices such as lithium-ion secondary batteries, lithium-ion capacitors, and air cells have been developed.

In addition, in a power storage device, a positive electrode and a negative electrode are each provided with a plurality of protrusions so as to increase the capacity; in such a power storage device, a top portion of the plurality of protrusions of the positive electrode and the negative electrode is provided with an insulator in order to reduce pressure applied to a separator between the positive electrode and the negative electrode when the volume of the positive electrode and the negative electrode increases owing to charge/discharge (see Patent Documents 1 to 3).

As an electrode of a lithium ion battery which is integrated on a silicon chip, submicron-diameter silicon pillars formed over an n-type silicon wafer is studied (see Patent Document 4). In Patent Document 4, a reactive ion etching is used to form the pillars. Further, Patent Document 4 discloses that photolithography may be used.

An electrode for a power storage device is manufactured by providing an active material over and in contact with a surface of a current collector. As a negative electrode active material, a material which can occlude and release ions functioning as carriers (hereinafter referred to as carrier ions), such as carbon or silicon, is used. For example, silicon or phosphorus-doped silicon can occlude about four times as many carrier ions as carbon and thus has higher theoretical capacity than carbon and is advantageous in increasing the capacity of a power storage device.

However, when the amount of carrier ions which are occluded is increased, the volume of an active material greatly changes in accordance with occlusion and release of carrier ions in charge/discharge cycle, resulting in lower adhesion between a current collector and silicon and deterioration in battery characteristics due to charge/discharge. Accordingly, a layer formed using silicon is formed over a current collector and a layer formed using a graphite is formed over the layer formed using silicon, thereby reducing deterioration in battery characteristics due to expansion and contraction of the layer formed using silicon (see Patent Document 5).

Silicon has lower electric conductivity than carbon; thus, by covering surfaces of silicon particles with a graphite and forming an active material layer including the silicon particles over a current collector, a negative electrode in which the resistivity of the active material layer is reduced is manufactured.

In recent years, the use of a graphene as a conductive electronic material in semiconductor devices has been studied. A graphene refers to a sheet of one atomic layer of carbon molecules having $sp^2$ bonds.

A graphene is chemically stable and has favorable electric characteristics and thus has been expected to be applied to channel regions of transistors, vias, wirings, and the like included in the semiconductor devices. In addition, particles of an active material are coated with a graphite or a graphene in order to increase the conductivity of a material for an electrode in a lithium-ion battery (see Patent Document 6).

REFERENCE

Patent Document

[Patent Document 1] Japanese Published Patent Application No. 2010-219030
[Patent Document 2] Japanese Published Patent Application No. 2010-239122
[Patent Document 3] Japanese Published Patent Application No. 2010-219392
[Patent Document 4] Japanese Published Patent Application No. 2010-135332
[Patent Document 5] Japanese Published Patent Application No. 2001-283834
[Patent Document 6] Japanese Published Patent Application No. 2011-29184

SUMMARY OF THE INVENTION

However, when an electrode of a power storage device includes a pillar structure, it is difficult to maintain strength of the pillar structure, which is a problem. The strength of the pillar structure cannot be maintained due to charge/discharge of carrier ions in some cases. When the strength is decreased, the pillar structure is fallen from a current collector. In addition, when a power storage device is columnar, an electrode can be rolled; however, it is difficult to employ the pillar structure in the rolled electrode.

However, when a layer formed using silicon provided over a current collector is covered with a layer formed using a graphite, since the thickness of the layer formed using a graphite is large, e.g., submicron to micron, the amount of carrier ions transferred between an electrolyte and the layer formed using silicon is reduced. In addition, in an active material layer including silicon particles covered with a graphite, the amount of silicon contained in the active material layer is reduced. Consequently, the amount of reaction between silicon and carrier ions is reduced, which causes a reduction in charge/discharge capacity and makes it difficult to perform charge/discharge at high speed in a power storage device.

In addition, even when particles of an active material are covered with a graphene, it is difficult to suppress expansion of the volume of the particles of the active material owing to repeating charge/discharge and to suppress pulverization of the particles of the active material due to the expansion.

In view of the above, an embodiment of the present invention provides a power storage device in which charge/discharge capacity are high, charge/discharge can be performed at high speed, and deterioration in battery characteristics due to charge/discharge is small.

One embodiment of the present invention is a negative electrode for a power storage device including a negative electrode active material structure having a plurality of protrusions and a bar which serves as a connecting bridge over a first protrusion and a second protrusion among the plurality of protrusions. The bar can increase the strength of the plurality of protrusions and can prevent the plurality of protrusions from falling from a current collector and the like. The negative electrode active material structure contains a negative electrode active material.

One embodiment of the present invention is a power storage device including a negative electrode active material structure having a plurality of protrusions, a bar which serves as a connecting bridge over a first protrusion and a second protrusion among the plurality of protrusions, and graphene covering a side surface of the protrusion. Note that the graphene may cover the side surface and a top surface of the protrusion. Further, the graphene may cover the side surface of the protrusion and a top surface of the bar.

Graphene includes single-layer graphene and multilayer graphene. In some cases, graphene contains oxygen at a concentration of higher than or equal to 2 at. % and lower than or equal to 11 at. %, preferably higher than or equal to 3 at. % and lower than or equal to 10 at. %.

The plurality of protrusions may be broken due to repeating occlusion and release of lithium ions; however, such a break can be prevented by covering the plurality of protrusions with graphene.

Since the protrusions are covered with graphene, even when a protrusion is broken, the conductivity between the broken protrusion and another protrusion which is not broken can be kept.

One embodiment of the present invention is a negative electrode for a power storage device including a negative electrode active material structure having a plurality of protrusions, a common portion provided for the plurality of protrusions, and a bar which serves as a connecting bridge over a first protrusion and a second protrusion among the plurality of protrusions. The common portion contains the same material as the negative electrode active material. In this case, the common portion serves as a negative electrode active material. Further, in one mode of the present invention, the common portion may serve as a current collector. With such a common portion, at least the plurality of protrusions can be held without being separated from one another.

One embodiment of the present invention is a negative electrode for a power storage device including a negative electrode active material structure having a plurality of protrusions, a current collector provided for the plurality of protrusions, and a bar which serves as a connecting bridge over a first protrusion and a second protrusion among the plurality of protrusions. The current collector contains a different material from the negative electrode active material.

The plurality of protrusions is perpendicular to the common portion or the current collector and thus can be arranged with high density and a space therebetween can be left. Such an arrangement of the plurality of protrusions can suppress contact between the protrusions when the protrusions expand by occluding lithium ions. In addition, when the lengths of the protrusions are adjusted, surface area needed to occlude and release lithium ions can be expanded.

In the case where the plurality of protrusions is provided in a cylindrical-shaped power storage device in one embodiment of the present invention, the bar is oriented in a direction perpendicular to a direction in which the current collector is rolled (bent). The bar facilitates bending of the current collector and also prevents the plurality of protrusions from being separated from one another even when the current collector is bent.

In one embodiment of the present invention, the plurality of protrusions is formed using silicon. The plurality of protrusions may be formed using silicon to which an impurity imparting conductivity such as phosphorus or boron is added. Single crystal silicon, polycrystalline silicon, or amorphous silicon can be used. The plurality of protrusions of the negative electrode active material structure becomes, in many cases, amorphous silicon after occlusion and release of lithium ions. Thus, the plurality of protrusions may be formed using amorphous silicon and the common portion may be formed using single crystal silicon or polycrystalline silicon.

Since amorphous silicon is less changed in volume by occlusion and release of lithium ions than silicon having crystallinity such as single crystal silicon or polycrystalline silicon, amorphous silicon is preferable on this point.

In one embodiment of the present invention, among the plurality of protrusions, at least an axis of the first protrusion and an axis of the second protrusion are oriented in the same direction. When axes are oriented in the same direction, plane orientations or crystal orientations are the same. In order to form the first protrusion and the second protrusion whose axes are oriented in the same direction, an etching process can be used. That is, the protrusion in one embodiment of the present invention is different from a whisker-shaped structure in which a whisker randomly grows in any direction.

In one embodiment of the present invention, a mask is formed over a silicon substrate, part of the silicon substrate is etched to form the plurality of protrusions, and the bar which serves as a connecting bridge over the first protrusion and the second protrusion among the plurality of protrusions is formed. Organic materials are provided between the plurality protrusions after the protrusions are formed, and surfaces of the organic materials are flattened, and then, the bar is formed.

When the negative electrode active material structure having such a plurality of protrusions is used as a negative electrode of a power storage device, high-speed charge/discharge becomes possible, and breaking and separation caused by change in strength of the negative electrode active material due to charge/discharge can be suppressed.

The plurality of protrusions have translation symmetry and formed with high uniformity in the negative electrode, so that local reaction can be reduced in each of the positive electrode and the negative electrode, and carrier ions and the active material can react with each other uniformly between the positive electrode and the negative electrode. Consequently, when the negative electrode is used for a power storage device, high-speed charge/discharge becomes possible. In addition, when the reaction occurs uniformly, the strength also changes uniformly, so that breaking and separation of the negative electrode active material can be suppressed.

The bar of the negative electrode can increase the strength of the negative electrode active material structure including the plurality of protrusions and can prevent the plurality of protrusions from falling. With the bar, the negative electrode can be easily bent, and separation of the protrusions can be prevented even when the negative electrode is bent.

When a surface of the active material is in contact with an electrolyte in a power storage device, the electrolyte and the active material react with each other, so that a film is formed over the surface of the active material. The film is called a solid electrolyte interface (SEI) and considered necessary to relieve the reaction of the active material and the electrolyte for stabilization. However, when the thickness of the film is increased, carrier ions are less likely to be occluded in the active material, leading to problems such as a reduction in conductivity of carrier ions between the active material and the electrolyte and a waste of the electrolyte. To solve these problems, as described in one embodiment of the present invention, the negative electrode active material is covered with graphene, whereby an increase in thickness of the film can be suppressed. As a result, a reduction in conductivity of carrier ions and a waste of the electrolyte can be suppressed.

As described in one embodiment of the present invention, when the negative electrode active material is formed using silicon, resistivity is increased because silicon has lower electric conductivity than carbon, and the electric conductivity is further lowered when silicon becomes amorphous by charge and discharge.

In addition, as described in one embodiment of the present invention, when the negative electrode active material containing silicon is covered with graphene, the graphene serves as a path through which carrier ions pass because carbon has higher electric conductivity than silicon, so that electrons can be transferred at high speed. In addition, a graphene can have a thin sheet-like shape and thus does not hinder the negative electrode active material. That is, the negative electrode active material can be increased in amount even when the negative electrode active material is covered with graphene. As a result, the conductivity of carrier ions can be increased and the carrier ions are easily occluded by the negative electrode active material. Accordingly, a power storage device including the negative electrode can perform charge/discharge at high speed.

According to one embodiment of the present invention, a negative electrode for a power storage device and a power storage device in which charge/discharge capacity are high and deterioration of a negative electrode active material due to charge and discharge is small can be provided.

DETAILED DESCRIPTION OF THE INVENTION

Hereinafter, embodiments will be described with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments.

Embodiment 1

In this embodiment, a structure of a negative electrode of a power storage device which is less deteriorated through charge/discharge and has excellent charge/discharge cycle characteristics and a manufacturing method thereof will be described with reference to FIGS. 1A and 1B, FIGS. 2A and 2B, FIGS. 3A and 3B, FIGS. 4A and 4B, and the like. FIGS. 1A, 2A, 3A, and 4A are perspective views. FIGS. 1B, 2B, 3B, and 4B are cross-sectional views taken along line A-B.

Figure 1A:
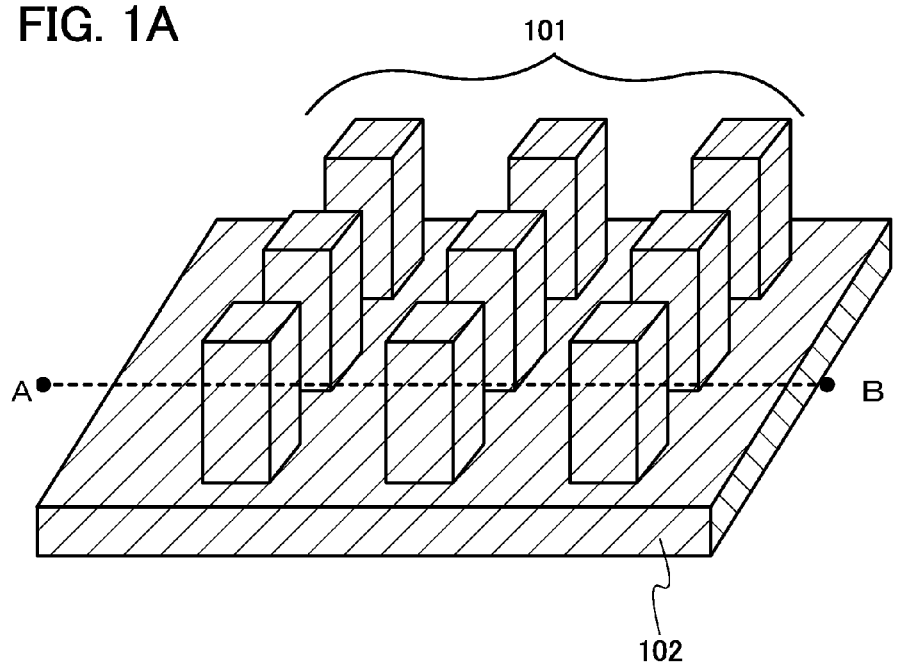
FIGS. 1A and 1B are diagrams showing a negative electrode and a manufacturing method thereof.

As shown in FIG. 1A, a negative electrode active material includes a plurality of protrusions 101. As a negative electrode active material, a material capable of occluding lithium ions can be used. For example, silicon can be used. The shape of the negative electrode active material is described by using a negative electrode active material structure. The negative electrode active material structure includes the plurality of protrusions 101. The plurality of protrusions 101 is held by a common portion 102. In other words, the negative electrode active material structure can also include the common portion 102. In the case where the common portion 102 and the plurality of protrusions 101 contain the same materials, the common portion 102 can serve as a negative electrode active material. For example, the common portion 102 and the plurality of protrusions 101 may contain silicon. Alternatively, the common portion 102 and the plurality of protrusions 101 may contain different materials. In this case, the common portion 102 and the plurality of protrusions 101 serve as a current collector and a negative electrode material, respectively. For example, the plurality of protrusions 101 and the common portion 102 are formed using silicon and a conductive material which does not occlude lithium ions, respectively. For example, titanium, aluminum, or copper can be used as such a material contained in the common portion 102. The negative electrode includes such a negative electrode active material structure including a plurality of protrusions.

Figure 1B:
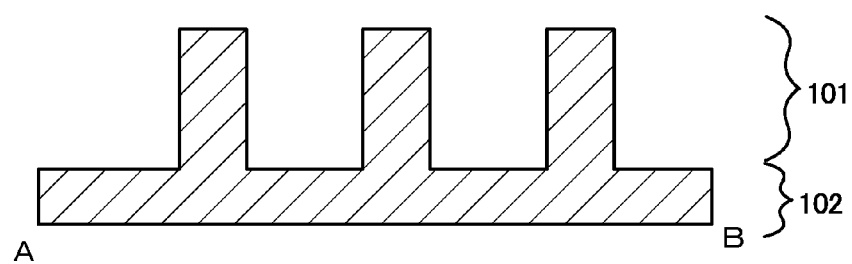

To obtain the structure shown in FIGS. 1A and 1B, the plurality of protrusions 101 is formed by etching. For example, a single-crystal silicon substrate (the plane orientation of (100)) is etched. As a method for etching, a dry etching method or a wet etching method can be used as appropriate. Note that when a Bosch process which is a deep etching method is used, a high protrusion can be formed. For example, an n-type silicon substrate is etched with an inductively coupled plasma (ICP) apparatus by using, as an etching gas, chlorine, hydrogen bromide, and oxygen, whereby the common portion 102 and the plurality of protrusions 101 can be formed. Note that in order to obtain the common portion 102 including silicon, the etching depth in the above etching process is adjusted. The flow ratio of the etching gas may be adjusted appropriate. For example, the flow ratio of chlorine, hydrogen bromide, and oxygen can be 50:75:15.

Figure 14:
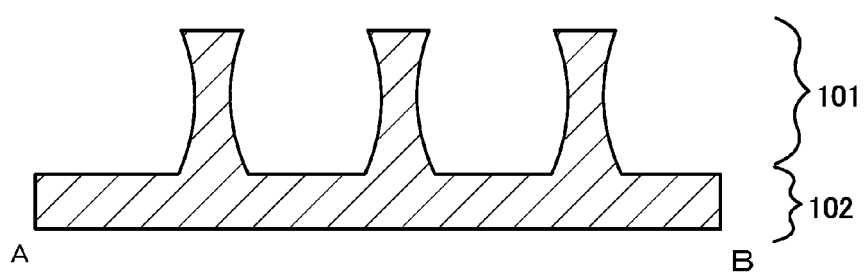
FIG. 14 is a diagram showing a shape of a negative electrode.

By anisotropic etching, side surfaces of the plurality of protrusions 101 are perpendicular to the common portion 102. On the other hand, by isotropic etching, the side surfaces of the plurality of protrusions 101 can recede as shown in FIG. 14. That is, the side surfaces are curved. Accordingly, the surface area of the negative electrode active material can be increased.

When a single crystal silicon substrate is used, a plane direction of the substrate may be (111) or (110). Further, a polycrystalline silicon substrate may be used instead of a single crystal silicon substrate. As such a silicon substrate, an n-type silicon substrate to which phosphorus is added or a p-type silicon substrate to which boron is added may be used.

In etching, a mask for forming the plurality of protrusions 101 is used. The mask can be formed using one or more of the following inorganic materials: silicon oxide, silicon nitride, silicon oxynitride, silicon nitride oxide, aluminum oxide, and aluminum nitride. Alternatively, the mask can be formed using one or more of the following organic materials: acrylic resin, epoxy resin, polyimide, and polyamide. In addition, when a stack of an inorganic material and an organic material are used, a silicon substrate can be deeply etched. The mask formed using an inorganic material and/or an organic material may be left over the plurality of protrusions 101 without being removed.

As described in this embodiment, the silicon substrate is etched with the use of the masks, whereby the plurality of protrusions 101 whose axes are oriented in the same direction can be formed. Further, the plurality of protrusions 101 whose shapes are substantially the same can be formed.

Figure 2A:
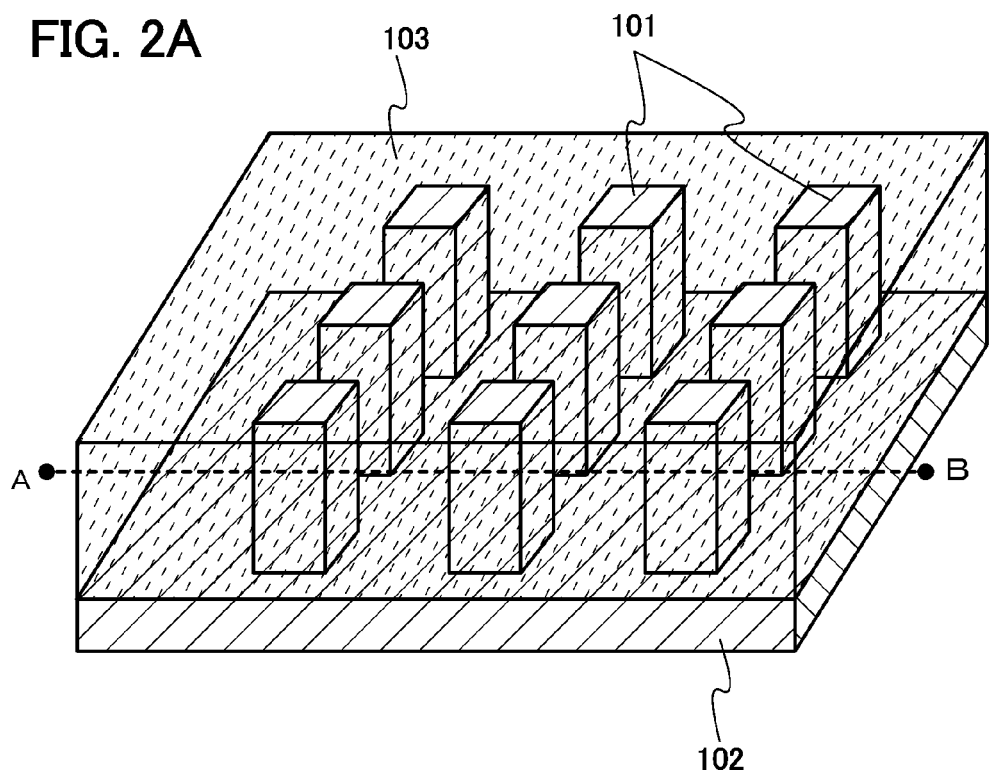
FIGS. 2A and 2B are diagrams showing a negative electrode and a manufacturing method thereof.
Figure 2B:
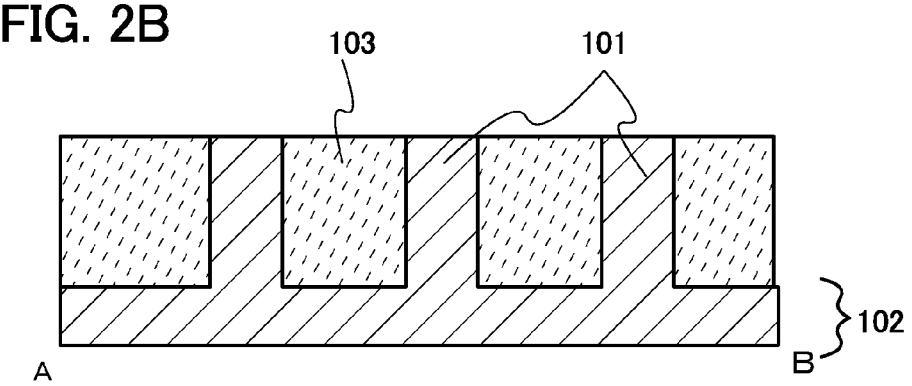

As shown in FIGS. 2A and 2B, an organic material 103 is provided so as to fill a space between the protrusions 101. The organic material 103 can be formed using a resist material, polyimide, acrylic, or the like, by a coating method, a droplet discharge method, or the like. Accordingly, the top surface of the organic material 103 is aligned with the top surfaces of the plurality of protrusions 101, so that the flat surface is obtained.

Figure 3A:
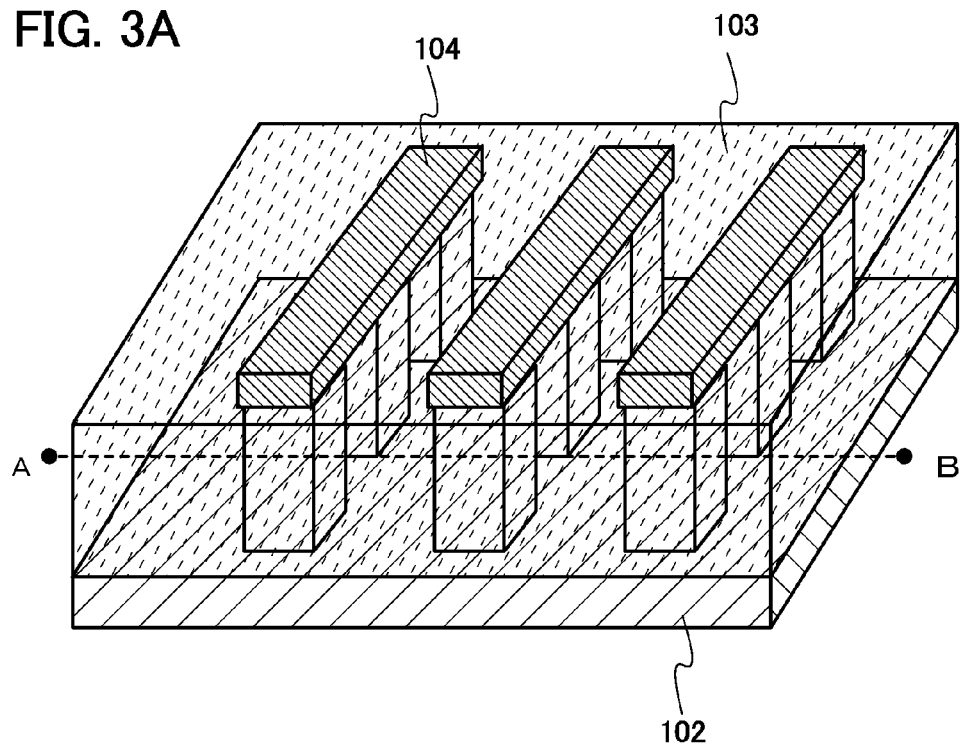
FIGS. 3A and 3B are diagrams showing a negative electrode and a manufacturing method thereof.
Figure 3B:
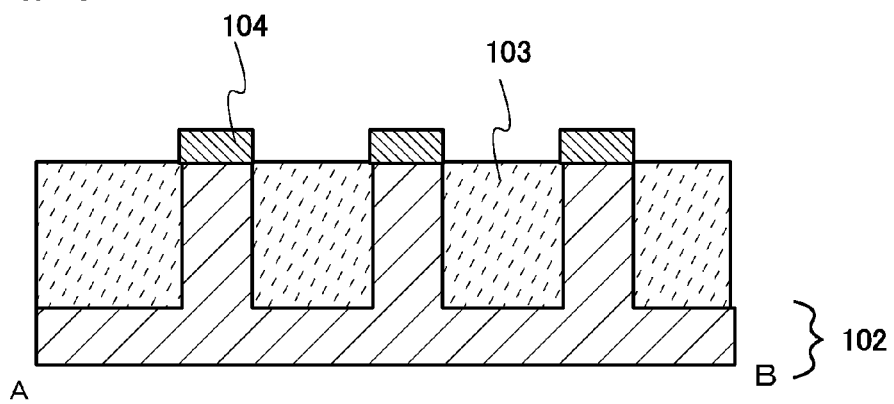

As shown in FIGS. 3A and 3B, a plurality of bars 104 is formed over the plurality of protrusions 101. Any one of the plurality of bars 104 serves as a connecting bridge over at least two protrusions (i.e., a first protrusion and a second protrusion) among the plurality of protrusions 101. The first protrusion and the second protrusion are not necessarily adjacent to each other. With the bar, the plurality of protrusions 101 can be increased in strength, the negative electrode can be easily bent, and separation of the protrusions can be prevented even when the negative electrode is bent, which is preferable.

To obtain the bar shown in FIGS. 3A and 3B, a structure serving as the bar 104 is formed in the state where the organic material 103 is provided between the protrusions 101. As the structure serving as the bar, an insulator or a conductor can be used. The structure is etched, whereby the bar 104 can be obtained. The bars 104 are provided to overlap with the plurality of protrusions 101. With the organic material 103, the structure serving as the bar 104 can be formed and etched to form the bar 104. For that reason, not only the plurality of protrusions 101, but also the organic material 103 are provided below the bars 104.

When the bar 104 is formed using an insulator, an inorganic material or an organic material can be used. As an inorganic material, one or more of silicon oxide, silicon nitride, silicon oxynitride, silicon nitride oxide, aluminum oxide, and aluminum nitride is used. As an organic material, one or more of acrylic resin, epoxy resin, polyimide, and polyamide is used. Alternatively, the insulator is formed by stacking the inorganic material and the organic material. The thickness of the bar 104 is preferably 100 nm to 10 μm inclusive. When the bar 104 is formed using a conductor, titanium, aluminum, copper, silicon, or the like can be used. Using the conductor, the bar 104 can have a function as a conductive additive. Alternatively, a material capable of occluding carrier ions such as silicon may be used.

Figure 4A:
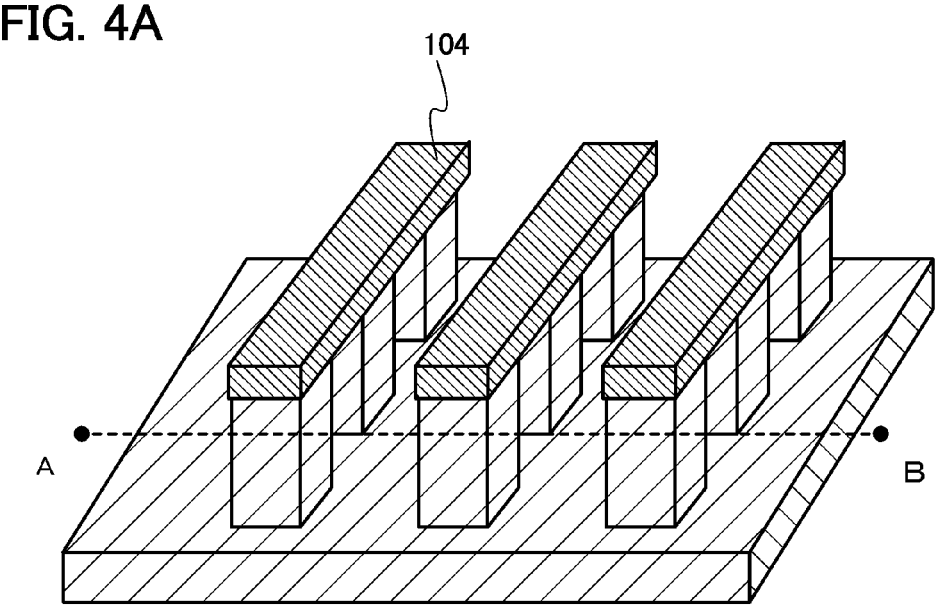
FIGS. 4A and 4B are diagrams showing a negative electrode and a manufacturing method thereof.
Figure 4B:
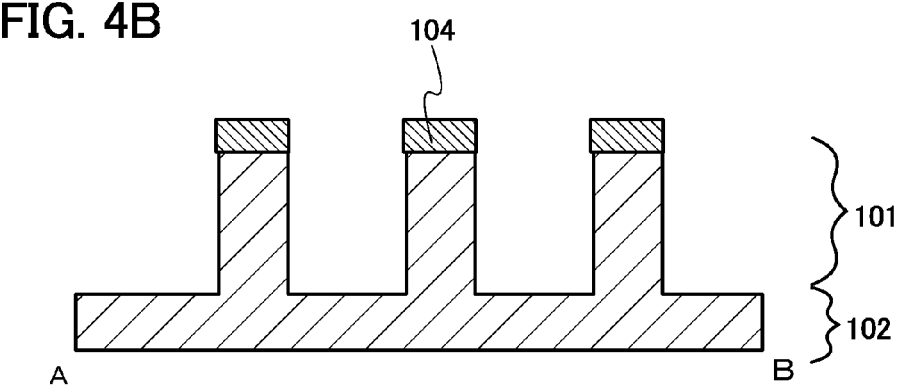

As shown in FIGS. 4A and 4B, the organic material 103 is removed. Thus, a structure including the plurality of protrusions 101 and the bars 104 provided over the plurality of protrusions 101 can be obtained. In other words, the negative electrode includes the negative electrode active material structure including the plurality of protrusions 101 and the bar. A power storage device including the negative electrode can be obtained.

As shown in FIGS. 4A and 4B, the plurality of protrusions 101 may be held by the common portion 102.

Figure 5:
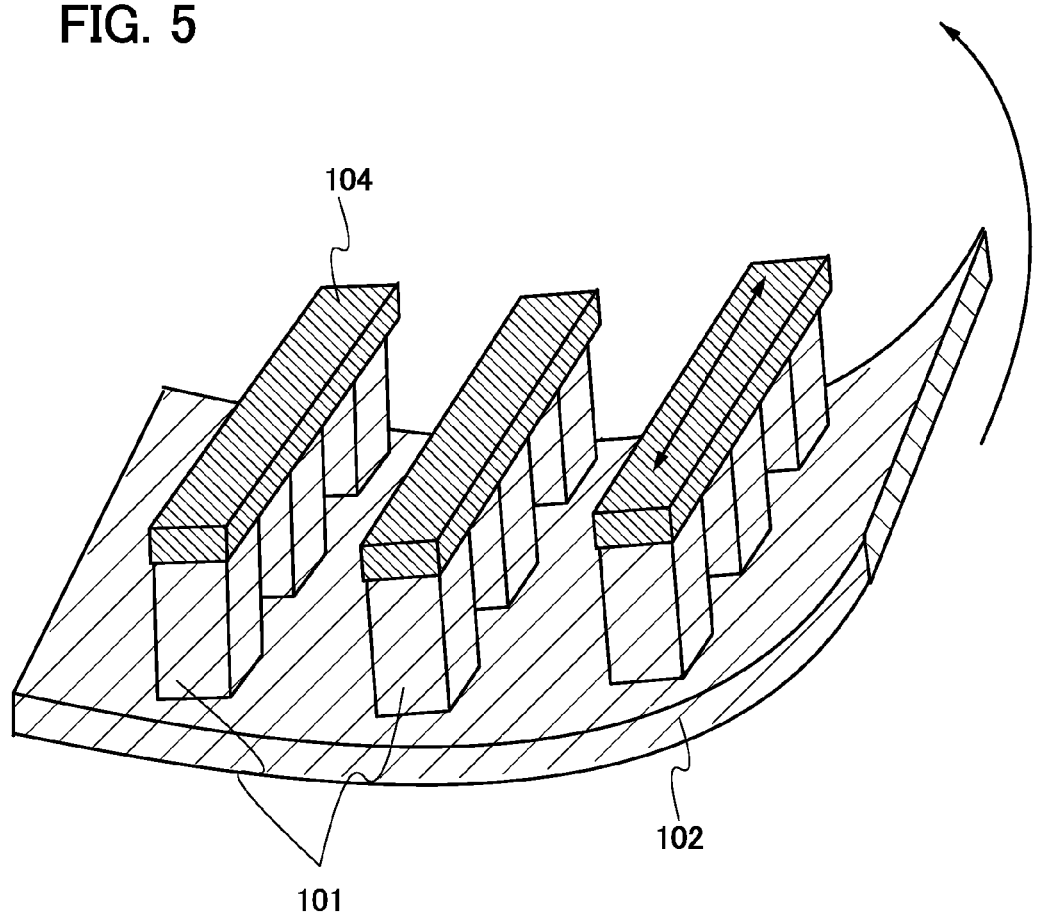
FIG. 5 is a diagram showing a shape of a negative electrode.

As shown in FIG. 5, when the common portion 102 and the like is rolled up and arranged in a columnar power storage device, the bar 104 is preferably provided to extend in a direction perpendicular to a direction in which the common portion 102 is rolled (bent). In such a manner, the protrusions 101 can be prevented from being separated due to the bending. Further, a structure which can be easily bent can be provided.

From FIGS. 1A and 1B, FIGS. 2A and 2B, FIGS. 3A and 3B, and FIGS. 4A and 4B, the plurality of protrusions 101 can be represented as a plurality of cylindrical-shaped portions, a plurality of needle-shaped portions, a plurality of bar-shaped portions, or a plurality of convex-shaped portions, according to their shape.

Figure 6A:
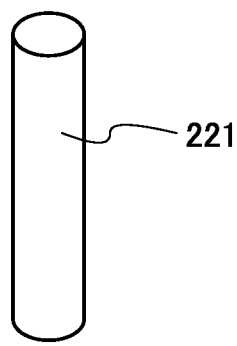
FIGS. 6A to 6C are diagrams each showing a shape of a protrusion.
Figure 6B:
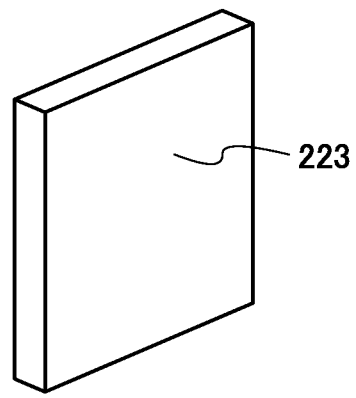
Figure 6C:
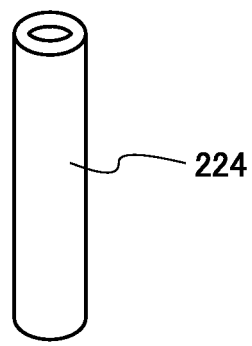

Although the plurality of protrusions 101 is square pole in FIGS. 1A and 1B, FIGS. 2A and 2B, FIGS. 3A and 3B, and FIGS. 4A and 4B, the shape of the plurality of protrusion 101 is not limited thereto. The shape of the plurality of protrusions 101 may be a cylindrical shape 221 as shown in FIG. 6A, in which case a bar can be provided over the plurality of cylindrical protrusions. In addition, the shape of the plurality of protrusions 101 may be a wall shape 223 as shown in FIG. 6B, in which case a bar can be provided over the plurality of wall-shaped protrusions. In addition, a cylindrical shape 224 in which a cylinder with hollow center portions as shown in FIG. 6C may be used, in which case, a bar can be provided over the plurality of protrusions 101 each of which has a cylindrical shape with a hollow center portion. In any case, the protrusion can function as a negative electrode active material.

Top surfaces of the plurality of protrusions 101 serving as negative electrode active materials, and the like are preferably flat because the bars 104 are provided over the top surfaces. On the other hand, the top surfaces of the plurality of protrusions 101 and the like may be uneven in order to increase adhesion with the bars 104.

Note that a negative electrode active material refers to a material capable of electrochemically occluding and releasing ions which are carriers (hereinafter, referred to as carrier ions). Lithium ions can be used as the carrier ions. This is called lithium-ion secondary batteries. As examples of carrier ions which can be used instead of lithium ions, alkali-metal ions such as sodium ions and potassium ions; alkaline-earth metal ions such as calcium ions, strontium ions, and barium ions; beryllium ions; magnesium ions; and the like are given. As the negative electrode active material, other than silicon which is described above, any one of germanium, tin, aluminum, and the like can be used. Note that it is preferable to use silicon because silicon has high theoretical charge/discharge capacity, which leads to miniaturization of the power storage device. Note that an impurity element imparting one conductivity type, such as phosphorus or boron, may be added to silicon. Silicon to which the impurity element imparting one conductivity type, such as phosphorus or boron, is added has higher conductivity, so that the conductivity of the negative electrode can be increased.

An active material layer contains, in addition to the negative electrode active material, one or more of a conductive additive, a binder, and the like.

FIGS. 12A to 12D show arrangements of the plurality of protrusions 101 when seen from the above.

Figure 12A:
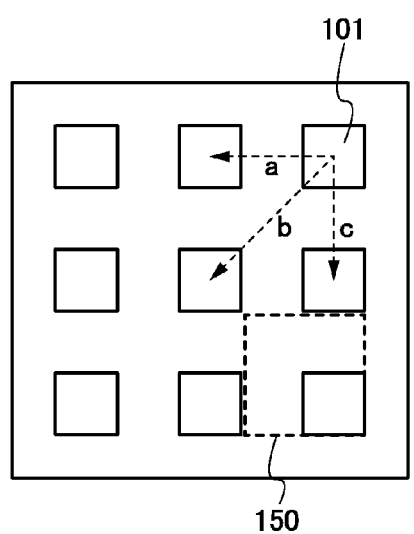
FIGS. 12A to 12D are top views showing arrangements of protrusions of a negative electrode active material structure.

In FIG. 12A, the plurality of protrusions 101 is arranged. The plurality of protrusions 101 is arranged at regular intervals in the X-axis direction and the Y-axis direction when seen from the above. The interval can be determined on the assumption that the plurality of protrusions is expanded by occluding lithium ions. In the case where the plurality of protrusions are expanded equally in the X-axis direction and the Y-axis direction, the plurality of protrusions 101 are arranged at regular intervals in the X-axis direction and the Y-axis direction. For example, when the plurality of protrusions is more expanded in the X-axis direction than in the Y-axis direction, the interval in the X-axis direction may be wider. When the plurality of protrusions is more expanded in the Y-axis direction than in the X-axis direction, the interval in the Y-axis direction may be widened. In an area 150 indicated by dashed lines in FIG. 12A, the proportion of an area of one protrusion is preferably 25% to 60% inclusive. That is, the proportion of the area 150 where the protrusion does not exist is 40% to 75% inclusive. When the proportion of the protrusion is 25% or higher, theoretical charge/discharge capacity of the negative electrode can be about 1000 mAh/g or more. On the other hand, when the proportion of the area where the protrusion does not exist is 40% or higher, the protrusions do not have contact with each other even when the protrusions are expanded. As a result, high charge/discharge capacity can be achieved and deterioration of the negative electrode due to charge/discharge can be reduced.

Figure 12B:
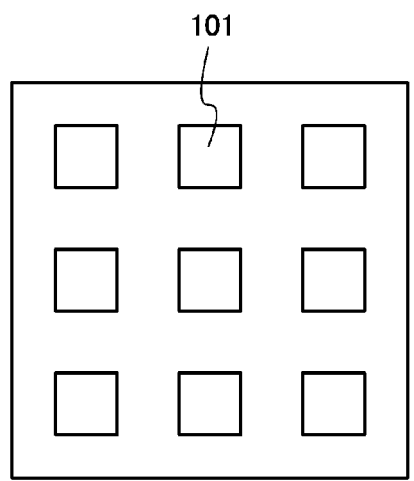

FIG. 12B is a top view after movement of FIG. 12A in the direction α. Since the plurality of protrusions 101 is arranged at regular intervals, the plurality of protrusions 101 is not changed in the arrangement between FIGS. 12A and 12B. That is, the plurality of protrusions 101 has translation symmetry. Here, the plurality of protrusions 101 in FIG. 12A move in the direction a; however, the same result as FIG. 12B can be obtained after movement in the direction b or c.

Figure 12C:
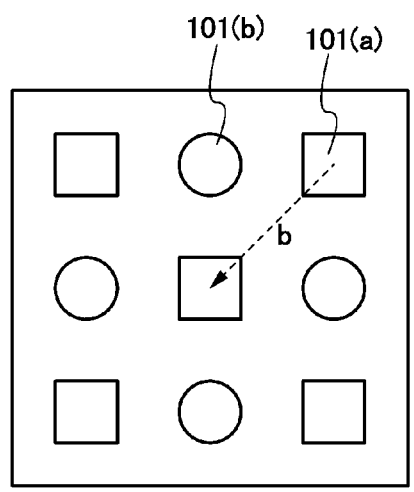

FIG. 12C shows a state in which the plurality of protrusions 101 includes a protrusion 101(a) having a square top surface and a protrusion 101(b) having a circular top surface which are arranged alternately. As shown in FIG. 12C, the plurality of protrusions 101 may be different in shape.

Figure 12D:
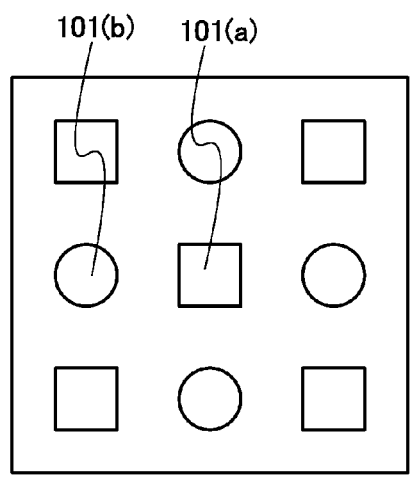

FIG. 12D is a top view after the state of FIG. 12C is moved in the direction b. Since the plurality of protrusions 101(a) having a square top surface is arranged at regular intervals, the plurality of protrusions 101(b) having a circular top surface is not changed in the arrangement between FIGS. 12C and 12D. That is, the plurality of protrusions 101(a) and the plurality of protrusions 101(b) have translation symmetry.

Such an arrangement of the plurality of protrusions 101 is maintained even when charge and discharge are repeated. Further, even when the plurality of protrusions 101 is broken or fallen after charge and discharge are repeated, an arrangement of bottoms of the plurality of protrusions 101 is maintained.

By providing the plurality of protrusions 101 such that they have translation symmetry, variation in electron conductivity among the plurality of protrusions can be reduced. Accordingly, local reaction in the positive electrode and the negative electrode can be reduced, reaction between carrier ions and the active material can occur uniformly, and diffusion overvoltage (concentration overvoltage) can be prevented, so that the reliability of battery characteristics can be increased.

The plurality of protrusions 101 can have a single crystal structure, a polycrystalline structure, or an amorphous structure as appropriate. In addition, the common portion 102 can have a single crystal structure, a polycrystalline structure, or an amorphous structure as appropriate. For example, the common portion 102 can have a single crystal structure or a polycrystalline structure, and the plurality of protrusions 101 can have an amorphous structure. Alternatively, part of the plurality of protrusions 101 can have a single crystal structure or a polycrystalline structure, and the other part of the plurality of protrusions 101 can have an amorphous structure. Note that the part of the plurality of protrusions 101 includes at least a region in contact with the common portion 102.

Note that a boundary generated when the common portion 102 and the plurality of protrusions 101 are formed using different materials is determined as a boundary between the common portion 102 and the plurality of protrusions 101. When the common portion 102 and the plurality of protrusions 101 are formed using the same material, the above boundary is also used.

In addition, the longitudinal directions of the plurality of protrusions 101 are parallel with each other. The longitudinal direction of the plurality of protrusion is the long-axis direction which is straight and passes the top of the protrusion (or the center of the top surface). When the axes of the plurality of protrusions are oriented in the same direction, the angle between the straight lines of the plurality of protrusions which each pass the top of the protrusion (or the centers of the top surface) is less than or equal to 10 degrees, preferably, less than or equal to 5 degrees in the longitudinal direction. It is preferable that crystal orientations and the like are substantially the same because expansion tendency due to charge and discharge is also the same.

Preferably, the plurality of protrusions 101 has substantially the same shapes. "The plurality of protrusions 101 has substantially the same shapes" means that cross-sectional shapes cut in directions substantially perpendicular to the longitudinal directions or cross-sectional shapes cut in directions perpendicular to the longitudinal directions are substantially the same. Note that the shapes cannot stay the same because of charge and discharge. With such a structure, the volume of the negative electrode active material can be controlled.

The width of the plurality of protrusion 101 in a lateral cross-sectional shape is greater than or equal to 0.1 μm and less than or equal to 1 μm, preferably greater than or equal to 0.2 μm and less than or equal to 0.5 μm. The height of the plurality of protrusion 101 is five times to hundred times, preferably ten times to fifty times, of the width of the plurality of protrusion, typically, greater than or equal to 0.5 μm and less than or equal to 100 μm, preferably greater than or equal to 1 μm and less than or equal to 50 μm.

In addition, with the width of the plurality of protrusion 101 being greater than or equal to 0.1 μm, the charge/discharge capacity can be increased. With the width of the plurality of protrusion 101 being less than or equal to 1 μm, even when the protrusions expand in charge/discharge, the protrusions can be prevented from being broken. In addition, with the height of the plurality of protrusion 101 being greater than or equal to 0.5 μm, the charge/discharge capacity can be increased. With the height of the plurality of protrusion 101 being less than or equal to 100 μm, even when the protrusions expand in charge/discharge, the protrusions can be prevented from being broken.

The height of the protrusion 101 is a distance, in the cross-sectional shape in the longitudinal direction, between the top of the protrusion 101 (or the center of the top surface) and the common portion 102 in the direction parallel with the axis which passes the top, that is, a distance between the top and the boundary between the common portion 102 and the protrusion 101.

In addition, since the plurality of protrusions 101 which can serve as negative electrode active materials is provided, a surface area of the negative electrode active material is larger than a surface area of a plate-like negative electrode active material. Further, axes of the plurality of protrusions 101 are oriented in the same direction and the protrusions protrude in the direction perpendicular to the common portion 102, so that the density of the protrusions can be increased and the surface area can be increased.

The plurality of protrusions 101 are provided with a predetermined distance therebetween. The distance between the plurality of protrusions 101 is preferably 1.29 times to 2 times of the width of the plurality of protrusions 101. Consequently, even when the volume of the protrusion 101 increases due to charge of the power storage device including the negative electrode, the protrusions 101 are not in contact with each other and can be prevented from being broken, and moreover, a reduction in charge/discharge capacity of the power storage device can be prevented.

The plurality of protrusions 101 has translation symmetry and formed with high uniformity in the negative electrode, so that local reaction can be reduced in each of the positive electrode and the negative electrode, and carrier ions and the active material can react with each other uniformly between the positive electrode and the negative electrode. Consequently, in the case where the plurality of protrusions 101 is provided for the power storage device, high-speed charge/discharge becomes possible, and breakdown and separation of the active material due to charge/discharge can be suppressed, whereby a power storage device with improved cycle characteristics can be manufactured. Furthermore, when the shapes of the plurality of protrusions 101 are substantially the same, local charge/discharge can be reduced, and the volume of the active material can be controlled. In addition, when the heights of the protrusions are substantially the same, load can be prevented from being applied locally in the manufacturing process of the battery, which can increase the yield. Accordingly, specifications of the battery can be well controlled.

Figure 17:
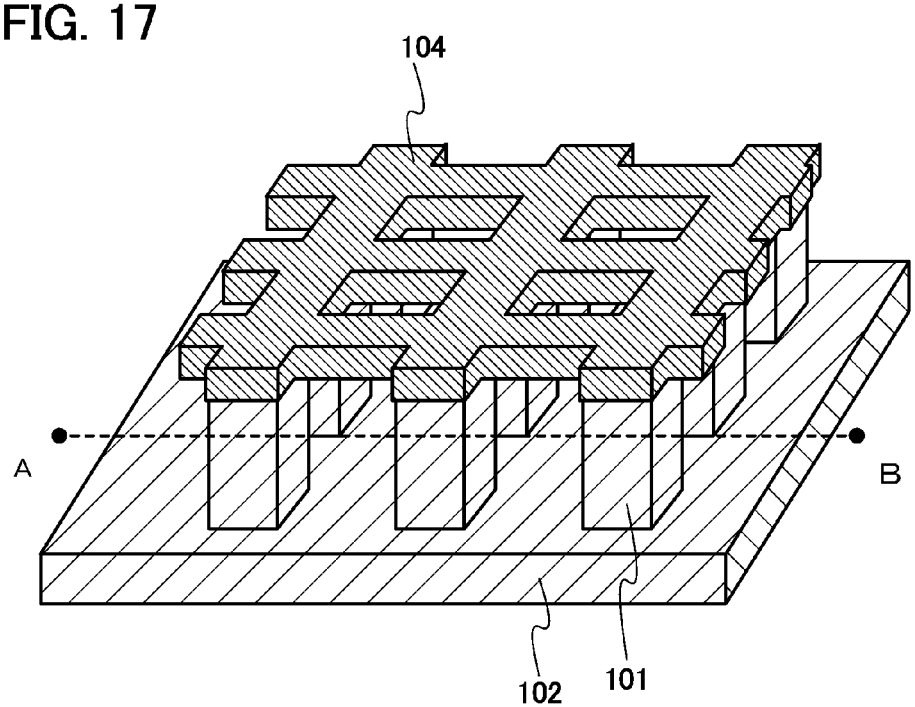
FIG. 17 is a diagram showing a negative electrode.

FIG. 17 shows a modification example of the bar 104. The bar 104 is provided in a lattice pattern to serves as a connecting bridge over at least a first protrusion to a fourth protrusion among the plurality of protrusions 101, which leads to an increase in the strength of the plurality of protrusions 101.

As described above, a negative electrode of a power storage device which is less deteriorated through charge/discharge and has excellent charge/discharge cycle characteristics can be provided.

Embodiment 2

In this embodiment, a structure of a negative electrode of a power storage device which is less deteriorated through charge/discharge and has excellent charge/discharge cycle characteristics and a manufacturing method thereof will be described with reference to FIGS. 8A to 8C. The negative electrode described in this embodiment includes graphene, which is different from the negative electrode in Embodiment 1.

Figure 8A:
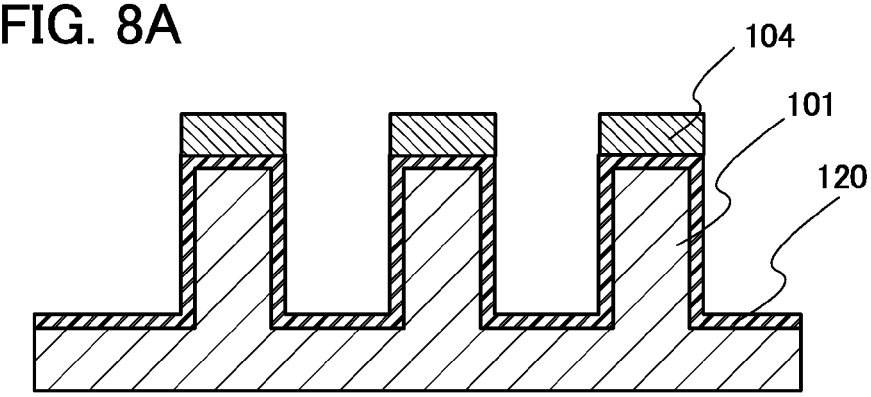
FIGS. 8A to 8C are diagrams showing negative electrodes covered with graphene.

In the structure shown in FIG. 8A, graphene 120 which covers the plurality of protrusions 101 is provided between top portions of the plurality of protrusions 101 and the bars 104. The graphene 120 is provided on at least side surfaces of the negative electrode active material structure.

Figure 8B:
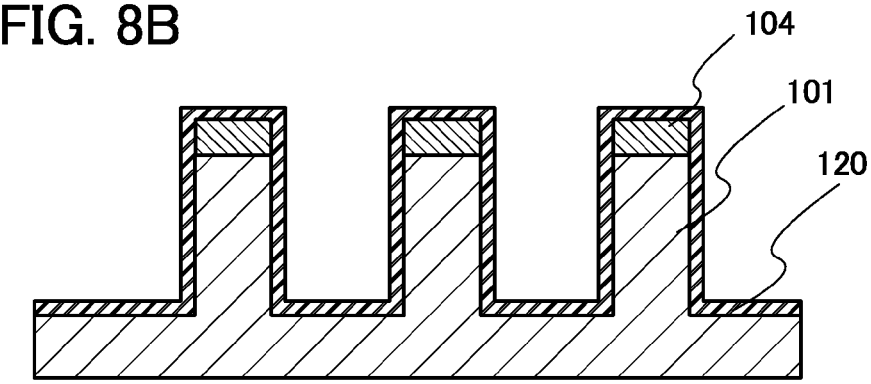

In the structure shown in FIG. 8B, the graphene 120 covering the plurality of protrusions 101 is also provided over upper portions of the bars 104.

Figure 8C:
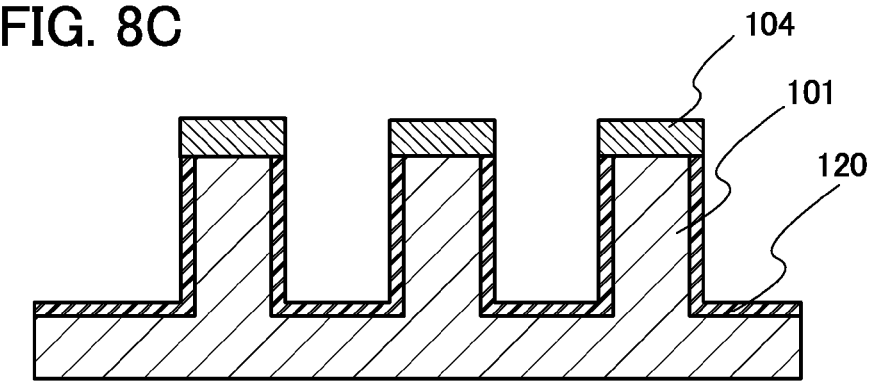

In the structure shown in FIG. 8C, the graphene 120 is provided on the side surfaces of the plurality of protrusions 101 and is not provided on a top surface and a side surface of the bars 104.

The graphene 120 covers at least the side surfaces of the protrusion. Preferably, the graphene 120 covers the side surfaces and the top surface of the protrusion or covers from the side surfaces of the protrusion to a top surface of the bar 104.

The graphene 120 functions as a conductive additive. In addition, the graphene 120 has a function of occluding carrier ions and thus functions as an active material in some cases.

The graphene 120 includes a single-layer graphene and a multilayer graphene in its category. The graphene 120 has a sheet-like shape with a length of several micrometers.

The single-layer graphene refers to a sheet of carbon molecules having $sp^2$ bonds with a thickness of one atomic layer and is very thin. In addition, six-membered rings each composed of carbon atoms are connected in the planar direction, and poly-membered rings each formed when a carbon-carbon bond in part of a six-membered ring is broken, such as a seven-membered ring, an eight-membered ring, a nine-membered ring, and a ten-membered ring, are partly formed.

A poly-membered ring is composed of a carbon atom and an oxygen atom in some cases. Alternatively, oxygen may be bonded to carbon of the poly-membered ring. In the case where graphene contains oxygen, a carbon bond in part of a six-membered ring is broken, and oxygen is bonded to the carbon whose bond is broken, whereby the poly-membered ring is formed. Therefore, an opening serving as a path through which ions can transfer is included in the bond between the carbon atom and the oxygen atom. That is, as the proportion of oxygen atoms included in a graphene is higher, the proportion of openings each functioning as a path through which ions can transfer is increased.

When the graphene 120 contains oxygen, the proportion of oxygen in the constituent atoms of the graphene is higher than or equal to 2 at. % and lower than or equal to 11 at. %, preferably higher than or equal to 3 at. % and lower than or equal to 10 at. %. As the proportion of oxygen is lower, the conductivity of the graphene can be increased. As the proportion of oxygen is higher, more openings serving as paths of ions in the graphene can be formed.

When the graphene 120 is a multilayer graphene, the graphene 120 includes a plurality of single-layer graphenes, typically, two to hundred single-layer graphenes and thus is very thin. Since the single-layer graphene contains oxygen, the interlayer distance between the graphenes is greater than 0.34 nm and less than or equal to 0.5 nm, preferably greater than or equal to 0.38 nm and less than or equal to 0.42 nm, more preferably greater than or equal to 0.39 nm and less than or equal to 0.41 nm. In a general graphite, the interlayer distance between the single-layer graphenes is 0.34 nm. Since the interlayer distance in the graphene 120 is longer than that in a general graphite, ions can easily transfer in a direction parallel with a surface of the single-layer graphene. In addition, the graphene 120 contains oxygen and includes a single-layer graphene or a multilayer graphene in which a poly-membered ring is formed and thus includes openings in places. Therefore, in the case where the graphene 120 is multilayer graphene, ions can transfer in the direction parallel to the surface of the single-layer graphene, i.e., through an opening between the single-layer graphenes, and in the direction perpendicular to the surface of the multilayer graphene, i.e., through the openings formed in the single-layer graphenes.

As a method for forming the graphene 120, there are a gas phase method and a liquid phase method. In the gas phase method, after forming, as a nucleus, nickel, iron, gold, copper, or an alloy containing such a metal over the plurality of protrusions 101, a graphene is grown from the nucleus in an atmosphere containing hydrocarbon such as methane or acetylene. In the liquid phase method, graphene oxide is provided over the surface of the plurality of protrusions 101 using a dispersion liquid containing graphene oxide, and then, graphene oxide is reduced to form a graphene.

The dispersion liquid containing graphene oxide is obtained by a method in which graphene oxide is dispersed in a solvent, a method in which after a graphite is oxidized in a solvent, graphite oxide is separated into graphene oxide to form a dispersion liquid containing graphene oxide, and the like. In this embodiment, the graphene 120 is formed over the plurality of protrusions 101 by using the dispersion liquid containing graphene oxide which is formed by, after oxidizing graphite, separating graphite oxide into graphene oxide.

In this embodiment, graphene oxide is formed by an oxidation method called a Hummers method. The Hummers method is as follows. A sulfuric acid solution of potassium permanganate, oxygenated water, or the like is mixed into single crystal graphite powder to cause oxidation reaction; thus, a graphite oxide aqueous solution is formed. Graphite oxide contains a functional group such as a carbonyl group such as a carboxyl group, or a hydroxyl group due to oxidation of carbon in graphite. Accordingly, the interlayer distance between adjacent graphenes of a plurality of graphenes in graphite oxide is longer than the interlayer distance of graphite. Then, ultrasonic vibration is transferred to the mixed solution containing graphite oxide, so that the graphite oxide whose interlayer distance is long can be cleaved to separate graphene oxide and to form a dispersion liquid containing graphene oxide. Note that a method for forming graphene oxide other than a Hummers method can be used as appropriate.

Graphene oxide includes an epoxy group, a carbonyl group such as a carboxyl group, a hydroxyl group, or the like. Note that hydrogen is ionized in a liquid having a polarity, graphene oxide including a carbonyl group is ionized and different graphene oxides are more likely to disperse. Accordingly, in a liquid having a polarity, graphene oxides disperse uniformly, and in a later step, graphene oxides can be provided uniformly over the surface.

In graphene oxide having a carboxyl group, part of an edge of a graphene sheet with a certain size is terminated by a carboxyl group (—COOH), and therefore, in a solvent such as water, hydrogen ions are released from the carboxyl group and graphene oxide itself is negatively charged and thus attracted to and deposited onto the anode. Thus, the graphene oxide is drawn to and deposited on an anode.

As a method of applying the mixed solution containing graphene oxide to the plurality of protrusions 101, a coating method, a spin coating method, a dipping method, a spray method, an electrophoresis method, or the like may be employed. Alternatively, these methods may be combined as appropriate to be employed. With the use of an electrophoresis method, ionized graphene oxide can be electrically transferred to the active material, whereby graphene oxide can be provided also on a surface of the common portion which is in contact with the plurality of protrusions. Accordingly, even when the plurality of protrusions is tall, graphene oxide can be provided uniformly over the surfaces of the common portion and the plurality of protrusions.

In a method for reducing graphene oxide provided over the plurality of protrusions 101, heating may be performed at higher than or equal to 150° C., preferably higher than or equal to 200° C. and lower than or equal to the temperature which the plurality of protrusions 101 can withstand, in a vacuum, air, an atmosphere of an inert gas (nitrogen, a rare gas, or the like), or the like. By being heated at a higher temperature and for a longer time, graphene oxide is reduced to a higher extent so that a graphene with high purity (i.e., with a low concentration of elements other than carbon) can be obtained. In addition, there is also a method in which graphene oxide is soaked in a reducing solution to be reduced.

Since graphite is treated with sulfuric acid according to the Hummers method, a sulfone group and the like are also bonded to the graphite oxide, and its decomposition (release) turns out to start at around 300° C. Thus, in a method for reducing graphene oxide by heating, graphene oxide is preferably reduced at higher than or equal to 300° C.

Through the reduction treatment, adjacent graphenes are bonded to each other to form a huge net-like or sheet-like shape. Further, through the reduction treatment, openings are formed in the graphenes due to the release of oxygen. Furthermore, the graphenes overlap with each other in parallel to a surface of the substrate. As a result, graphenes in which ions can transfer between layers and in openings is formed.

A space is provided between the plurality of protrusions 101. Further, graphene covers the plurality of protrusions 101. Thus, even when the negative electrode active material expands in charging, contact between the protrusions can be reduced. Even when the protrusion is separated, the protrusion can be prevented from being broken owing to the graphene. Moreover, also when the protrusion is broken, graphene can prevent separating of the protrusion. Further, since graphene has conductivity, the broken protrusion which occludes and releases carrier ions can be used as the negative electrode.

In the power storage device, when the surface of the active material is in contact with an electrolyte, the electrolyte and the active material react with each other, so that a film is formed over the surface of the active material. The film is called a solid electrolyte interface (SEI) and considered necessary to relieve the reaction of the active material and the electrolyte for stabilization. However, when the thickness of the film is increased, carrier ions are less likely to be occluded in the active material, leading to problems such as a reduction in conductivity of carrier ions between the active material and the electrolyte and a waste of the electrolyte.

A graphene 120 covering the plurality of protrusions 101 can suppress an increase in thickness of the film, so that a decrease in conductivity of carrier ions and loss of an electrolyte can be suppressed.

A graphene has high conductivity; by covering silicon with a graphene, electrons can transfer at high speed in a graphene. In addition, a graphene has a thin sheet-like shape; by covering the plurality of protrusions 101 with a graphene, the amount of an active material in an active material layer can be increased and carrier ions can transfer more easily than in a graphite. As a result, the conductivity of carrier ions can be increased, reaction between silicon that is an active material and carrier ions can be increased, and carrier ions can be easily occluded by the active material. Accordingly, a power storage device including the above negative electrode can perform charge/discharge at high speed.

Note that a silicon oxide layer may be provided between the plurality of protrusions 101 and the graphene 120 so as to cover the protrusions. By providing the silicon oxide layer over the plurality of protrusions 101, ions which are carriers are inserted into silicon oxide in charging of the power storage device. As a result, a silicate compound, e.g., alkali metal silicate such as $Li_4SiO_4$, $Na_4SiO_4$, or $K_4SiO_4$, alkaline earth metal silicate such as $Ca_2SiO_4$, $Sc_2SiO_4$, or $Ba_2SiO_4$, $Be_2SiO_4$, $Mg_2SiO_4$, or the like is formed. Such a silicate compound can serve as a path through which carrier ions transfer. By providing the silicon oxide layer, expansion of the plurality of protrusions 101 can be suppressed. Accordingly, breakdown of the plurality of protrusions 101 can be suppressed while the charge/discharge capacity is maintained. In discharging after charging, not all metal ions serving as carrier ions are released from the silicate compound formed in the silicon oxide layer and part of the metal ions remain, so that the silicon oxide layer is a mixture layer of silicon oxide and the silicate compound.

In addition, the thickness of the silicon oxide layer is preferably greater than or equal to 2 nm and less than or equal to 10 nm. With the thickness of the silicon oxide layer being greater than or equal to 2 nm, expansion of the plurality of protrusions 101 due to charge/discharge can be relieved. In addition, with the thickness of the silicon oxide layer being less than or equal to 10 nm, carrier ions can transfer easily, which can prevent a reduction in charge/discharge capacity. By providing the silicon oxide layer over the plurality of protrusions 101, expansion and contraction of the plurality of protrusions 101 in charge/discharge can be relieved, so that the plurality of protrusions 101 can be prevented from being broken.

As described above, a negative electrode of a power storage device which is less deteriorated through charge/discharge and has excellent charge/discharge cycle characteristics can be provided.

Embodiment 3

In this embodiment, a structure of a negative electrode of a power storage device which is less deteriorated through charge/discharge and has excellent charge/discharge cycle characteristics and a manufacturing method thereof will be described with reference to FIGS. 7A and 7B. The negative electrode described in this embodiment includes a current collector, which is different from the negative electrode in Embodiment 1. Further, a negative electrode including a graphene is described in this embodiment.

Figure 7A:
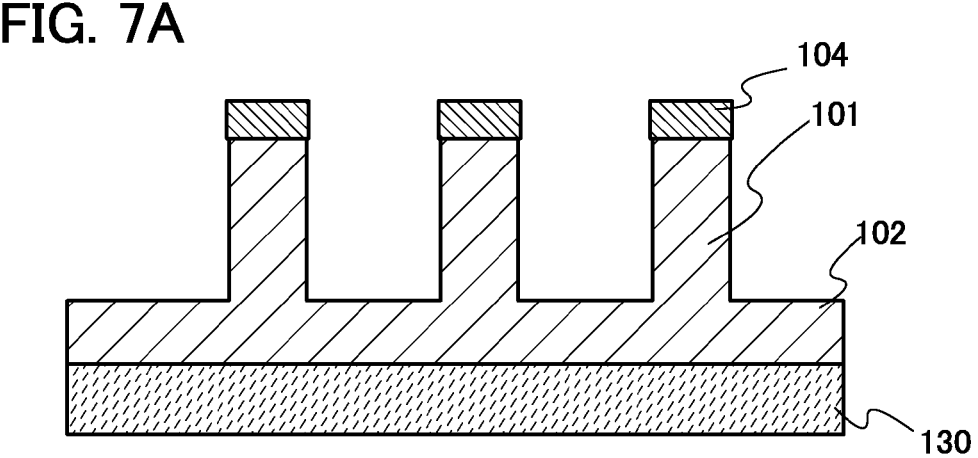
FIGS. 7A and 7B are diagrams showing a negative electrode including a current collector.

FIG. 7A is a cross-sectional view illustrating a negative electrode including a negative electrode active material structure. The negative electrode includes the negative electrode active material structure including the plurality of protrusions 101, and the bars 104 over the current collector 130. The negative electrode active material structure includes the common portion 102 on the lower side of the plurality of protrusions 101. That is, in FIG. 7A, the negative electrode includes the current collector 130, the negative electrode active material structure including the plurality of protrusions 101 and the common portion 102, and the bars 104.

Figure 7B:
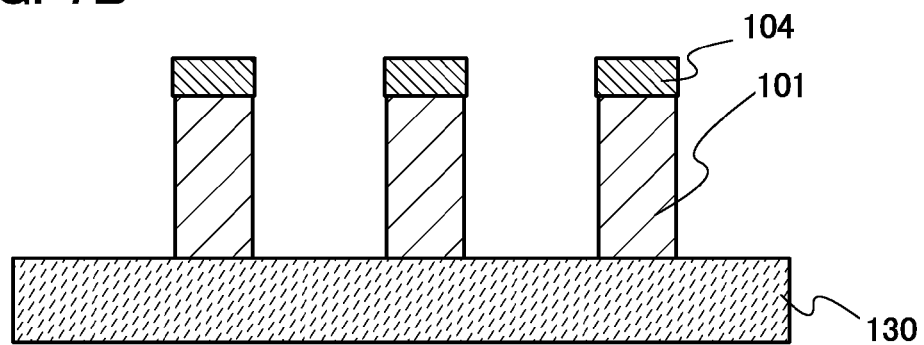

FIG. 7B is a cross-sectional view illustrating the plurality of protrusions 101 and the bars 104 over the current collector 130. The common portion 102 is not provided on the lower side of the plurality of protrusions 101. The plurality of protrusions 101 is provided over the current collector 130. That is, in FIG. 7B, the negative electrode includes the current collector 130, the negative electrode active material structure including the plurality of protrusions 101, and the bars 104.

The current collector 130 can be formed using a highly conductive material such as a metal typified by stainless steel, gold, platinum, zinc, iron, aluminum, copper, or titanium, or an alloy thereof. Note that the current collector 130 is preferably formed using an aluminum alloy to which an element which improves heat resistance, such as silicon, titanium, neodymium, scandium, or molybdenum, is added. Alternatively, the current collector 130 may be formed using a metal element which forms silicide by reacting with silicon. Examples of the metal element which forms silicide by reacting with silicon include zirconium, titanium, hathium, vanadium, niobium, tantalum, chromium, molybdenum, tungsten, cobalt, nickel, and the like.

The current collector 130 can have a foil-like shape, a plate-like shape (a sheet-like shape), a net-like shape, a punching-metal shape, an expanded-metal shape, or the like as appropriate.

Figure 11A:
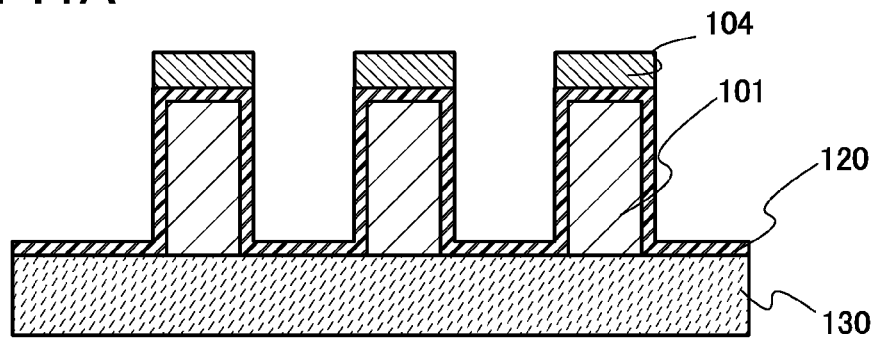
FIGS. 11A to 11C are diagrams showing negative electrodes covered with graphene.
Figure 11B:
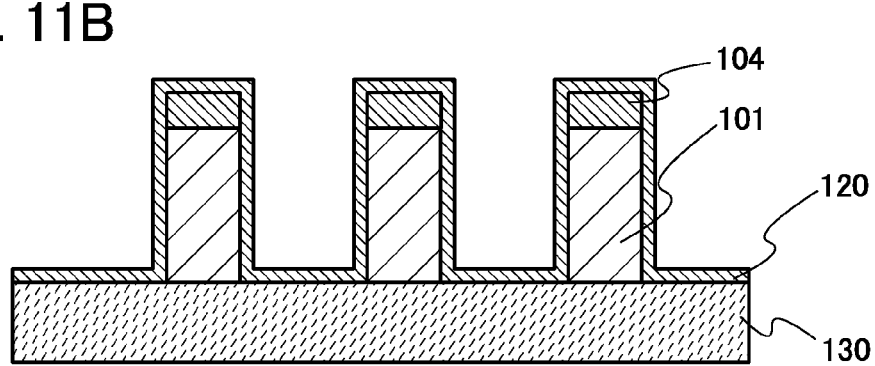
Figure 11C:
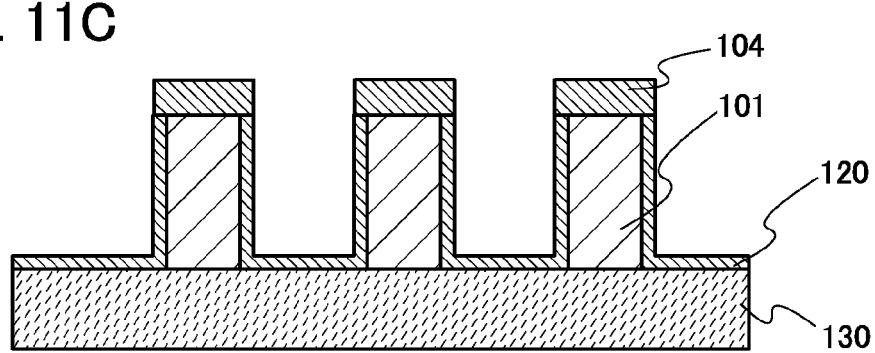

Graphene is preferably provided in the structures of FIGS. 7A and 7B, as in Embodiment 2. FIGS. 11A to 11C show structures in which graphene is added to the structure in FIG. 7B includes graphene, for example. In FIGS. 11A to 11C, the negative electrode includes the current collector 130, the negative electrode active material structure including the plurality of protrusions 101, the bars 104, and the graphene 120.

In FIG. 11A, the plurality of protrusions 101 is provided over the current collector 130, and the graphene 120 covering the plurality of protrusions 101 is provided. The graphene 120 covers a surface of the current collector 130 among the plurality of protrusions 101. The bars 104 are provided over the plurality of protrusions 101 with the graphene 120 provided therebetween. The plurality of protrusions 101 can be prevented from being separated from the current collector 130.

In FIG. 11B, the plurality of protrusions 101 is provided over the current collector 130, the bars 104 are provided over the plurality of protrusions 101, and the graphene 120 is provided to cover from the side surfaces of the plurality of protrusions 101 to a top surface of the bars 104. The graphene 120 covers a surface of the current collector 130 among the plurality of protrusions 101. The plurality of protrusions 101 can be prevented from being separated from the current collector 130.

In FIG. 11C, the plurality of protrusions 101 is provided over the current collector 130, the bars 104 are provided over the plurality of protrusions 101, and the graphene 120 covers at least the side surfaces of the plurality of protrusions 101. The graphene 120 covers a surface of the current collector 130 among the plurality of protrusions 101. The plurality of protrusions 101 can be prevented from being separated from the current collector 130.

The graphene 120 is in contact with part of the current collector 130, so that electrons can flow easily in the graphene 120 and reaction between the carrier ions and the active material can be improved.

When the current collector 130 is formed using a metal material that forms silicide, in the current collector 130, a silicide layer may be formed on the side in contact with the plurality of protrusions 101. For example, in the case where a metal material that forms silicide is used to form the current collector 130, titanium silicide, zirconium silicide, hafnium silicide, vanadium silicide, niobium silicide, tantalum silicide, chromium silicide, molybdenum silicide, cobalt silicide, nickel silicide, or the like is formed as a silicide layer.

In the negative electrode described in this embodiment, the current collector 130 serves as a support. Accordingly, when the current collector 130 has a foil-like shape, a net-like shape, or the like so as to be flexible, a flexible negative electrode can be formed.

In order to form such a negative electrode, a silicon layer serving as a negative electrode active material is formed over the current collector 130. Next, as in Embodiment 1, the silicon layer is etched with the use of a mask, so that the plurality of protrusions 101 can be formed.

The silicon layer can be formed by a CVD method, a sputtering method, an evaporation method, or the like as appropriate. For example, for the silicon layer, single-crystal silicon, microcrystalline silicon, or amorphous silicon can be used. The silicon layer may be formed using an n-type silicon layer to which phosphorus is added or a p-type silicon layer to which boron is added As described above, a negative electrode of a power storage device which is less deteriorated through charge/discharge and has excellent charge/discharge cycle characteristics can be provided.

Embodiment 4

In this embodiment, a structure of a positive electrode of a power storage device and a method for manufacturing the positive electrode are described.

Figure 9A:
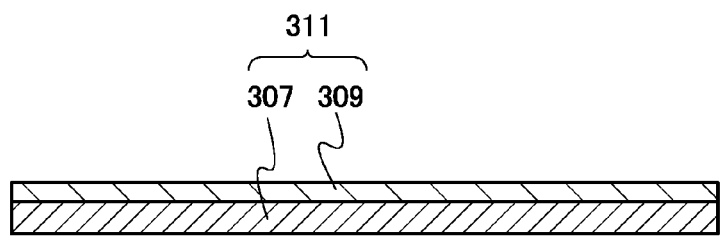
FIGS. 9A to 9C are diagrams showing a positive electrode.

FIG. 9A is a cross-sectional view of a positive electrode 311. In the positive electrode 311, a positive electrode active material layer 309 is formed over a positive electrode current collector 307.

As the positive electrode current collector 307, a material having high conductivity such as platinum, aluminum, copper, titanium, or stainless steel can be used. In addition, the positive electrode current collector 307 can have a foil shape, a plate shape, a net shape, or the like as appropriate.

The positive electrode active material layer 309 can be formed using a lithium compound such as $LiFeO_2$, $LiCoO_2$, $LiNiO_2$, or $LiMn_2O_4$, or $V_2O_5$, $Cr_2O_5$, or $MnO_2$ as a material.

Alternatively, a lithium-containing composite oxide having an olivine structure (a general formula $LiMPO_4$ (M is one or more of Fe(II), Mn(II), Co(II), and Ni(II))) may be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\le1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\le1$, $0<c<1$, $0<d<1$, and $0<e<1$), and $LiFe_fNi_gCo_hMn_iPO_4$ ($f+g+h+i\le1$, $0<f<1$, $0<g<1$, $0<h<1$, and $0<i<1$).

Alternatively, a lithium-containing composite oxide such as a general formula $Li_{(2-j)}MSiO_4$ (M is one or more of Fe(II), Mn(II), Co(II), and Ni(II); $0\le j\le2$) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_aNi_bSiO_4$, $Li_{(2-j)}Fe_aCo_bSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l\le1$, $0<k<1$, and $0<l<1$), $Li_{(2-j)}Fe_mNi_kCo_qSiO_4$, $Li_{(2-j)}Fe_mNi_nMn_qSiO_4$, $Li_{(2-j)}Ni_mCo_nMn_qSiO_4$ ($m+n+q\le1$, $0<m<1$, $0<n<1$, and $0<q<1$), and $Li_{(2-j)}Fe_rNi_sCo_tMn_uSiO_4$ ($r+s+t+u\le1$, $0<r<1$, $0<s<1$, $0<t<1$, and $0<u<1$).

In the case where carrier ions are alkali metal ions other than lithium ions, alkaline-earth metal ions, beryllium ions, or magnesium ions, the positive electrode active material layer 309 may contain, instead of lithium in the lithium compound and the lithium-containing composite oxide, an alkali metal (e.g., sodium or potassium), an alkaline-earth metal (e.g., calcium, strontium, or barium), beryllium, or magnesium.

Figure 9B:
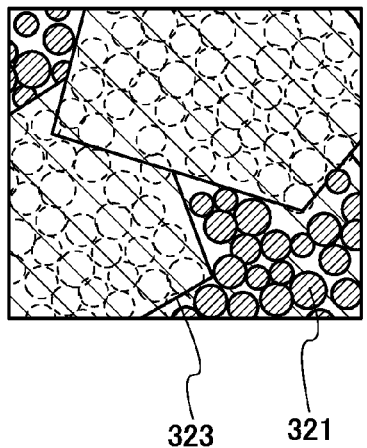

FIG. 9B is a plane view of the positive electrode active material layer 309. The positive electrode active material layer 309 contains positive electrode active materials 321 which are particles capable of occluding and releasing carrier ions, and graphenes 323 which cover a plurality of positive electrode active materials 321 and at least partly surround the plurality of positive electrode active materials 321. The different graphenes 323 cover surfaces of the plurality of the positive electrode active materials 321. The positive electrode active materials 321 may partly be exposed. The graphene 120 described in Embodiment 1 can be used as the graphene 323 as appropriate.

The size of the particle of the positive electrode active material 321 is preferably 20 nm to 100 nm inclusive. Note that the size of the particle of the positive electrode active material 321 is preferably smaller because electrons transfer in the positive electrode active materials 321.

In addition, sufficient characteristics can be obtained even when surfaces of the positive electrode active materials 321 are not covered with a graphite layer; however, it is preferable to use both the graphene and the positive electrode active material covered with a graphite layer because electrons transfer hopping between the positive electrode active materials and current flows.

Figure 9C:
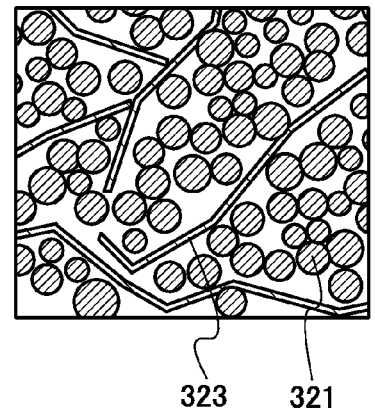

FIG. 9C is a cross-sectional view of part of the positive electrode active material layer 309 in FIG. 9B. The positive electrode active material layer 309 includes a positive electrode active material 321 and graphene 323 covering the positive electrode active material 321. The graphene 323 is observes as a linear shape in the cross-sectional view. A plurality of particles of the positive electrode active materials is at least partly surrounded with one graphene or plural graphenes. That is, the plurality of particles of the positive electrode active materials exists within one graphene or among plural graphenes. Note that the graphene has a bag-like shape, and the plurality of particles of the positive electrode active materials is surrounded with the bag-like portion in some cases. In addition, the positive electrode active materials are not covered with the graphenes and partly exposed in some cases.

The desired thickness of the positive electrode active material layer 309 is determined in the range of 20 μm to 100 μm. It is preferable to adjust the thickness of the positive electrode active material layer 309 as appropriate so that a crack and separation are not caused.

Note that the positive electrode active material layer 309 may contain acetylene black particles having a volume 0.1 times to 10 times inclusive as large as that of the graphene, carbon particles having a one-dimensional expansion (e.g., carbon nanofibers), or other binders.

As an example of the positive electrode active material, a material whose volume is expanded by occlusion of ions serving as carriers is given. When such a material is used, the positive electrode active material layer gets vulnerable and is partly collapsed by charging and discharging, resulting in lower reliability of a power storage device. However, even when the volume of the positive electrode active material expands due to charging and discharging, the graphene partly covers the periphery of the positive electrode active material, which allows prevention of dispersion of the positive electrode active material and the break of the positive electrode active material layer. That is to say, the multilayer graphene has a function of maintaining the bond between the positive electrode active materials even when the volume of the positive electrode active materials is increased and decreased by charging and discharging.

The graphene 323 is in contact with a plurality of particles of the positive electrode active materials and also serves as a conductive additive. Further, the multilayer graphene 323 has a function of holding the positive electrode active materials 321 capable of occluding and releasing carrier ions. Thus, binder does not necessarily have to be mixed into the positive electrode active material layer. Accordingly, the proportion of the positive electrode active materials in the positive electrode active material layer can be increased and the charge/discharge capacity of a power storage device can be increased.

Next, a formation method of the positive electrode active material layer 309 is described.

Slurry containing positive electrode active materials which are particles and graphene oxide is formed. After a positive electrode current collector is coated with the slurry, heating is performed in a reducing atmosphere for reduction treatment so that the positive electrode active materials are baked and part of oxygen is released from graphene oxide to form openings in graphene, as in the formation method of multilayer graphene, which is described in Embodiment 2. Note that oxygen in the graphene oxide is not entirely reduced and partly remains in the graphene. Through the above process, the positive electrode active material layer 309 can be formed over the positive electrode current collector 307. Consequently, the positive electrode active material layer 309 has higher conductivity.

Graphene oxide contains oxygen and thus is negatively charged in a polar solvent. As a result of being negatively charged, graphene oxide is dispersed. Accordingly, the positive electrode active materials contained in the slurry are not easily aggregated, so that the size of the particle of the positive electrode active material can be prevented from increasing. Thus, the transfer of electrons in the positive electrode active materials is facilitated, resulting in an increase in conductivity of the positive electrode active material layer.

Figure 10A:
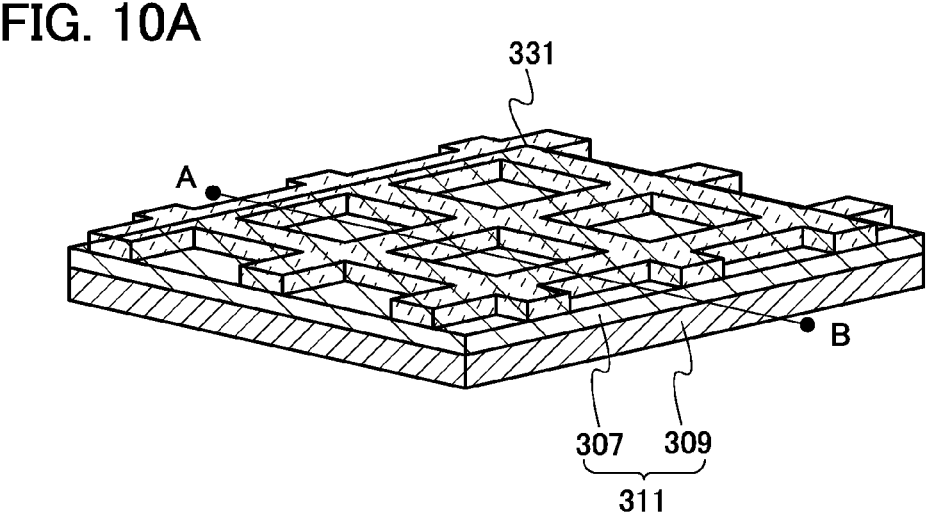
FIGS. 10A and 10B are diagrams showing a positive electrode.
Figure 10B:
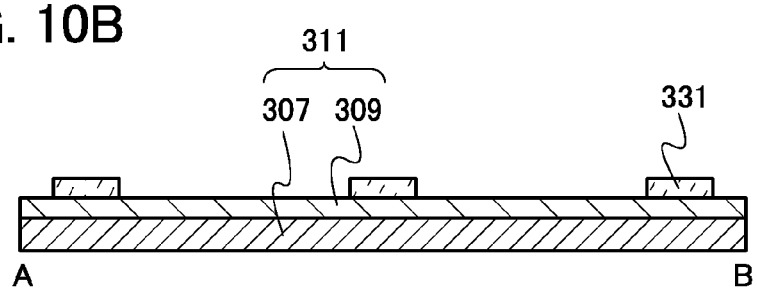

As illustrated in FIGS. 10A and 10B, a spacer 331 may be provided over a surface of the positive electrode 311. FIG. 10A is a perspective view of the positive electrode including the spacer, and FIG. 10B is a cross-sectional view along a line A-B in FIG. 10A.

As illustrated in FIGS. 10A and 10B, in the positive electrode 311, the positive electrode active material layer 309 is provided over the positive electrode current collector 307. The spacer 331 is provided over the positive electrode active material layer 309.

The spacer 331 can be formed using a material which has an insulating property and which does not react with an electrolyte. Specifically, an organic material such as an acrylic resin, an epoxy resin, a silicone resin, polyimide, or polyamide, low-melting-point glass such as glass paste, glass frit, or glass ribbon, or the like can be used. Since the spacer 331 is provided over the positive electrode 311, a separator is not needed in the power storage device completed later. Consequently, the number of components of the power storage device and the cost can be reduced.

The spacer 331 preferably has a planar shape which exposes part of the positive electrode active material layer 309, such as lattice-like shape or a closed circular or polygonal loop shape. As a result, contact between the positive electrode and the negative electrode can be prevented, and the transfer of carrier ions between the positive electrode and the negative electrode can be promoted.

The thickness of the spacer 331 is preferably greater than or equal to 1 µm and less than or equal to 5 µm, more preferably greater than or equal to 2 µm and less than or equal to 3 µm. As a result, as compared to the case where a separator having a thickness of several tens of micrometers is provided between the positive electrode and the negative electrode as in a conventional power storage device, the distance between the positive electrode and the negative electrode can be reduced, and the distance of movement of carrier ions between the positive electrode and the negative electrode can be short. Accordingly, carrier ions included in the power storage device can be effectively used for charge/discharge.

The spacer 331 can be formed by a printing method, an inkjet method, or the like as appropriate.

Embodiment 5

In this embodiment, a structure of a power storage device and a method for manufacturing the power storage device are described.

A lithium-ion secondary battery in this embodiment which is a typical example of power storage devices is described with reference to FIG. 13. Here, description is made below on a cross-sectional structure of the lithium-ion secondary battery.

Figure 13:
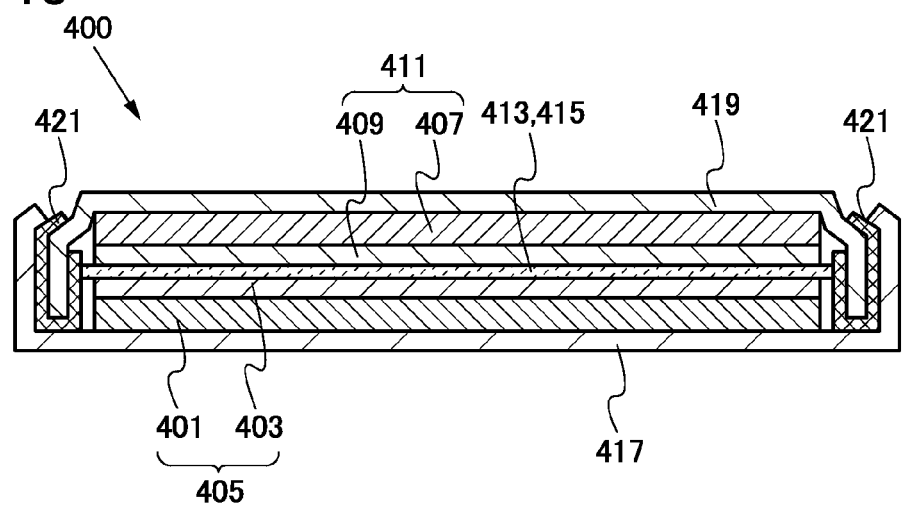
FIG. 13 is a diagram showing a power storage device.

FIG. 13 is a cross-sectional view of the lithium-ion secondary battery.

The lithium ion secondary battery 400 includes a negative electrode 405 including a negative electrode current collector 401 and a negative electrode active material layer 403 having a negative electrode active material structure, a positive electrode 411 including a positive electrode current collector 407 and a positive electrode active material layer 409, and a separator 413 sandwiched by the negative electrode 405 and the positive electrode 411. Note that the separator 413 includes an electrolyte 415. Further, the negative electrode current collector 401 is connected to an external terminal 417. The positive electrode current collector 407 is connected to an external terminal 419. An end portion of the external terminal 419 is embedded in a gasket 421. In other words, the external terminals 417 and 419 are insulated from each other with the gasket 421.

The negative electrode 405 can be formed using the structure of the negative electrode described in Embodiment 1, 2, or 3.

As the positive electrode current collector 407 and the positive electrode active material layer 409, the positive electrode current collector 307 and the positive electrode active material layer 309 which are described in this embodiment can be used as appropriate.

An insulating porous material is used for the separator 413. Typical examples of the separator 413 include cellulose (paper), polyethylene, and polypropylene.

When a positive electrode including a spacer over a positive electrode active material layer as illustrated in FIGS. 10A and 10B is used as the positive electrode 411, the separator 413 is not necessarily provided.

A solute of the electrolyte 415 contains lithium ions which are carrier ions. Typical examples of the solute of the electrolyte include lithium salt such as $LiClO_4$, $LiAsF_6$, $LiBF_4$, $LiPF_6$, and $Li(C_2F_5SO_2)_2N$.

Note that when carrier ions are alkali metal ions other than lithium ions, alkaline-earth metal ions, beryllium ions, or magnesium ions, instead of lithium in the above lithium salts, an alkali metal (e.g., sodium or potassium), an alkaline-earth metal (e.g., calcium, strontium, or barium), beryllium, or magnesium may be used for a solute of the electrolyte 415.

As a solvent of the electrolyte 415, a material in which lithium ions can transfer is used. As the solvent of the electrolyte 415, an aprotic organic solvent is preferably used. Typical examples of aprotic organic solvents include ethylene carbonate, propylene carbonate, dimethyl carbonate, diethyl carbonate, γ-butyrolactone, acetonitrile, dimethoxyethane, tetrahydrofuran, and the like, and one or more of these materials can be used. When a gelled polymer is used as the solvent of the electrolyte 415, safety against liquid leakage or the like is increased. Further, the lithium-ion secondary battery 400 can be made thinner and more lightweight. Typical examples of gelled polymers include a silicon gel, an acrylic gel, an acrylonitrile gel, polyethylene oxide, polypropylene oxide, a fluorine-based polymer, and the like. In addition, by using one or plural kinds of ionic liquid (room-temperature molten salt) which has features of non-flammability and non-volatility as a solvent of the electrolyte 415, short-circuit inside the power storage device can be prevented, and moreover, even when the internal temperature is increased due to overcharge or the like, explosion, ignition, or the like of the power storage device can be prevented.

As the electrolyte 415, a solid electrolyte such as $Li_3PO_4$ can be used. When the solid electrolyte is used, a separator is not necessarily used.

For the external terminals 417 and 419, a metal member such as a stainless steel plate or an aluminum plate can be used as appropriate.

Note that in this embodiment, a coin-type lithium-ion secondary battery is given as the lithium-ion secondary battery 400; however, any of lithium-ion secondary batteries with various shapes, such as a sealing-type lithium-ion secondary battery, a cylindrical lithium-ion secondary battery, and a square-type lithium-ion secondary battery, can be used. Further, a structure in which a plurality of positive electrodes, a plurality of negative electrodes, and a plurality of separators are stacked or rolled may be employed.

Next, a method for manufacturing the lithium-ion secondary battery 400 described in this embodiment is described.

By the manufacturing method described in Embodiments 1 and 5, the positive electrode 411 and the negative electrode 405 are formed.

Next, the negative electrode 405, the separator 413, and the positive electrode 411 are impregnated with the electrolyte 415. Then, the negative electrode 405, the separator 413, the gasket 421, the positive electrode 411, and the external terminal 419 are stacked in this order over the external terminal 417, and the external terminal 417 and the external terminal 419 are crimped to each other with a "coin cell crimper". Thus, the coin-type lithium-ion secondary battery can be manufactured.

Note that a spacer and a washer may be provided between the external terminal 417 and the negative electrode 405 or between the external terminal 419 and the positive electrode 411 so that the connection between the external terminal 417 and the negative electrode 405 or between the external terminal 419 and the positive electrode 411 is enhanced.

Embodiment 6

A power storage device according to one embodiment of the present invention described can be used as a power supply of various electronic appliances which are driven by electric power.

Specific examples of electronic appliances using the power storage device according to one embodiment of the present invention are as follows: display devices, lighting devices, desktop personal computers or laptop personal computers, image reproduction devices which reproduce a still image or a moving image stored in a recording medium such as a digital versatile disc (DVD), mobile phones, portable game machines, portable information terminals, e-book readers, video cameras, digital still cameras, high-frequency heating apparatus such as microwaves, electric rice cookers, electric washing machines, air-conditioning systems such as air conditioners, electric refrigerators, electric freezers, electric refrigerator-freezers, freezers for preserving DNA, dialysis devices, and the like. In addition, moving objects driven by an electric motor using electric power from a power storage device are also included in the category of electronic appliances. As examples of the moving objects, electric vehicles, hybrid vehicles which include both an internal-combustion engine and a motor, motorized bicycles including motor-assisted bicycles, and the like can be given.

In the electronic appliances, the power storage device according to one embodiment of the present invention can be used as a power storage device for supplying enough electric power for almost the whole power consumption (such a power storage device is referred to as a main power supply). Alternatively, in the electronic appliances, the power storage device according to one embodiment of the present invention can be used as a power storage device which can supply electric power to the electronic appliances when the supply of power from the main power supply or a commercial power supply is stopped (such a power storage device is referred to as an uninterruptible power supply). Further alternatively, in the electronic appliances, the power storage device according to one embodiment of the present invention can be used as a power storage device for supplying electric power to the electronic appliances at the same time as the electric power supply from the main power supply or a commercial power supply (such a power storage device is referred to as an auxiliary power supply).

Figure 15:
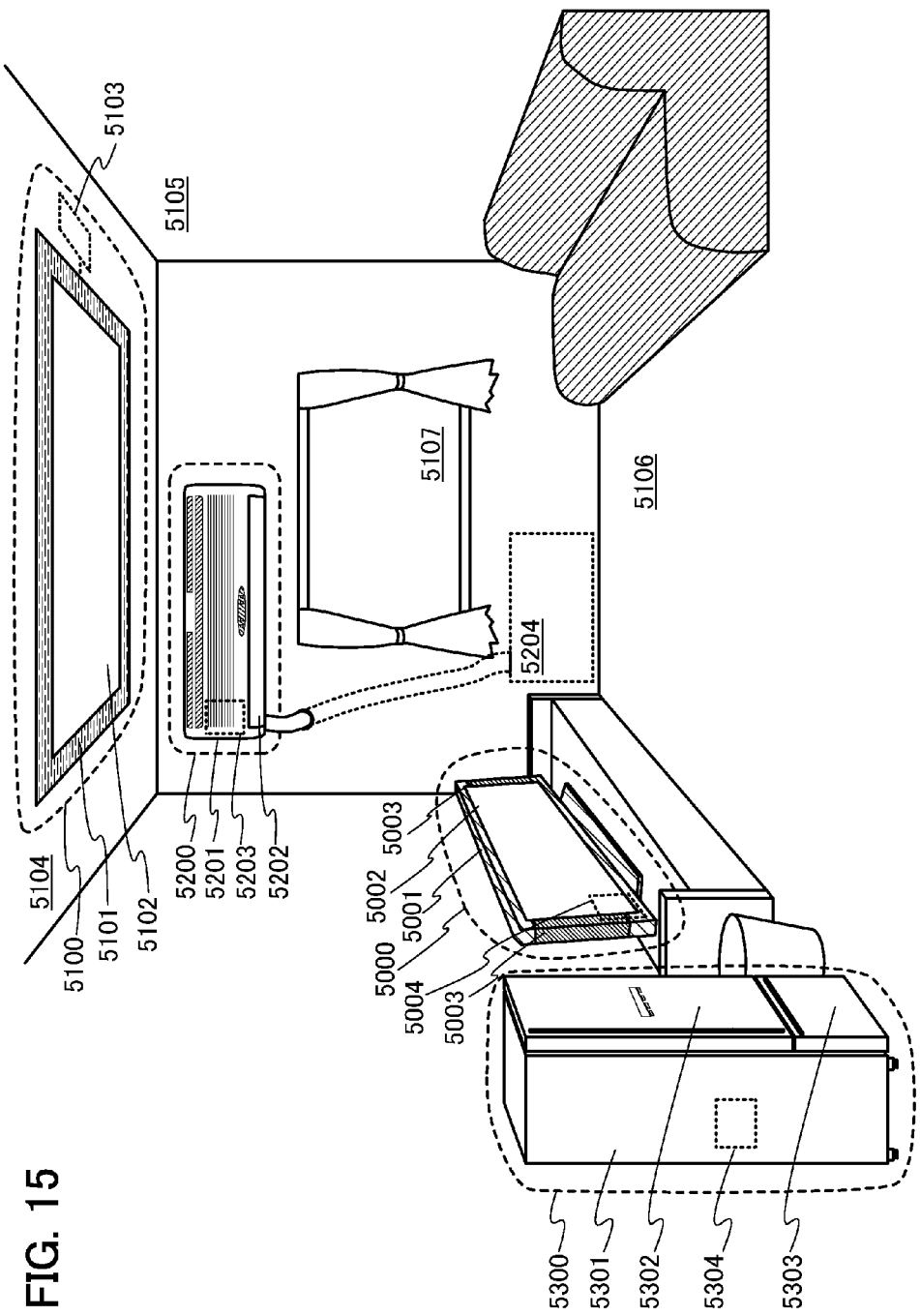
FIG. 15 is a diagram showing electronic appliances each including a power storage device.

FIG. 15 shows specific structures of the electronic appliances. In FIG. 15, a display device 5000 is an example of an electronic appliance including a power storage device 5004 according to one embodiment of the present invention. Specifically, the display device 5000 corresponds to a display device for TV broadcast reception and includes a housing 5001, a display portion 5002, speaker portions 5003, the power storage device 5004, and the like. The power storage device 5004 according to one embodiment of the present invention is provided inside the housing 5001. The display device 5000 can receive electric power from a commercial power supply. Alternatively, the display device 5000 can use electric power stored in the power storage device 5004. Thus, the display device 5000 can be operated with the use of the power storage device 5004 according to one embodiment of the present invention as an uninterruptible power supply even when electric power cannot be supplied from the commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), a field emission display (FED), and the like can be used for the display portion 5002.

Note that the display device includes, in its category, all of information display devices for personal computers, advertisement displays, and the like other than TV broadcast reception.

In FIG. 15, an installation lighting device 5100 is an example of an electronic appliance including a power storage device 5103 according to one embodiment of the present invention. Specifically, the lighting device 5100 includes a housing 5101, a light source 5102, the power storage device 5103, and the like. FIG. 15 shows the case where the power storage device 5103 is provided in a ceiling 5104 on which the housing 5101 and the light source 5102 are installed; alternatively, the power storage device 5103 may be provided in the housing 5101. The lighting device 5100 can receive electric power from the commercial power supply. Alternatively, the lighting device 5100 can use electric power stored in the power storage device 5103. Thus, the lighting device 5100 can be operated with the use of the power storage device 5103 according to one embodiment of the present invention as an uninterruptible power supply even when electric power cannot be supplied from the commercial power supply because of power failure or the like.

Note that although the installation lighting device 5100 provided in the ceiling 5104 is shown in FIG. 15 as an example, the power storage device according to one embodiment of the present invention can be used in an installation lighting device provided in, for example, a wall 5105, a floor 5106, a window 5107, or the like other than the ceiling 5104. Alternatively, the power storage device can be used in a tabletop lighting device and the like.

As the light source 5102, an artificial light source which provides light artificially by using electric power can be used. Specifically, a discharge lamp such as an incandescent lamp and a fluorescent lamp, and a light-emitting element such as an LED and an organic EL element are given as examples of the artificial light source.

In FIG. 15, an air conditioner including an indoor unit 5200 and an outdoor unit 5204 is an example of an electronic appliance including a power storage device 5203 according to one embodiment of the present invention. Specifically, the indoor unit 5200 includes a housing 5201, a ventilation duct 5202, the power storage device 5203, and the like. FIG. 15 shows the case where the power storage device 5203 is provided in the indoor unit 5200; alternatively, the power storage device 5203 may be provided in the outdoor unit 5204. Further alternatively, the power storage devices 5203 may be provided in both the indoor unit 5200 and the outdoor unit 5204. The air conditioner can receive electric power from the commercial power supply. Alternatively, the air conditioner can use electric power stored in the power storage device 5203. Specifically, in the case where the power storage devices 5203 are provided n both the indoor unit 5200 and the outdoor unit 5204, the air conditioner can be operated with the use of the power storage device 5203 according to one embodiment of the present invention as an uninterruptible power supply even when electric power cannot be supplied from the commercial power supply due to power failure or the like.

Note that although the separated air conditioner including the indoor unit and the outdoor unit is shown in FIG. 15 as an example, the power storage device according to one embodiment of the present invention can be used in an air conditioner in which the functions of an indoor unit and an outdoor unit are integrated in one housing.

In FIG. 15, an electric refrigerator-freezer 5300 is an example of an electronic appliance including a power storage device 5304 according to one embodiment of the present invention. Specifically, the electric refrigerator-freezer 5300 includes a housing 5301, a door for a refrigerator 5302, a door for a freezer 5303, and the power storage device 5304. The power storage device 5304 is provided in the housing 5301 in FIG. 15. Alternatively, the electric refrigerator-freezer 5300 can receive electric power from the commercial power supply or can use power stored in the power storage device 5304. Thus, the electric refrigerator-freezer 5300 can be operated with the use of the power storage device 5304 according to one embodiment of the present invention as an uninterruptible power supply even when electric power cannot be supplied from the commercial power supply because of power failure or the like.

Note that among the electronic appliances described above, a high-frequency heating apparatus such as a microwave and an electronic appliance such as an electric rice cooker require high electric power in a short time. The tripping of a circuit breaker of a commercial power supply in use of electric devices can be prevented by using the power storage device according to one embodiment of the present invention as an auxiliary power supply for supplying electric power which cannot be supplied enough by a commercial power supply.

In addition, in a time period when electronic appliances are not used, specifically when the proportion of the amount of power which is actually used to the total amount of power which can be supplied by a commercial power supply source (such a proportion referred to as usage rate of power) is low, power can be stored in the power storage device, whereby the usage rate of power can be reduced in a time period when the electronic appliances are used. In the case of the electric refrigerator-freezer 5300, electric power can be stored in the power storage device 5304 at night time when the temperature is low and the door for a refrigerator 5302 and the door for a freezer 5303 are not opened and closed. The power storage device 5304 is used as an auxiliary power supply in daytime when the temperature is high and the door for a refrigerator 5302 and the door for a freezer 5303 are opened and closed; thus, the usage rate of electric power in daytime can be reduced.

Next, a portable information terminal which is an example of electronic appliances will be described with reference to FIGS. 16A to 16C.

Figure 16A:
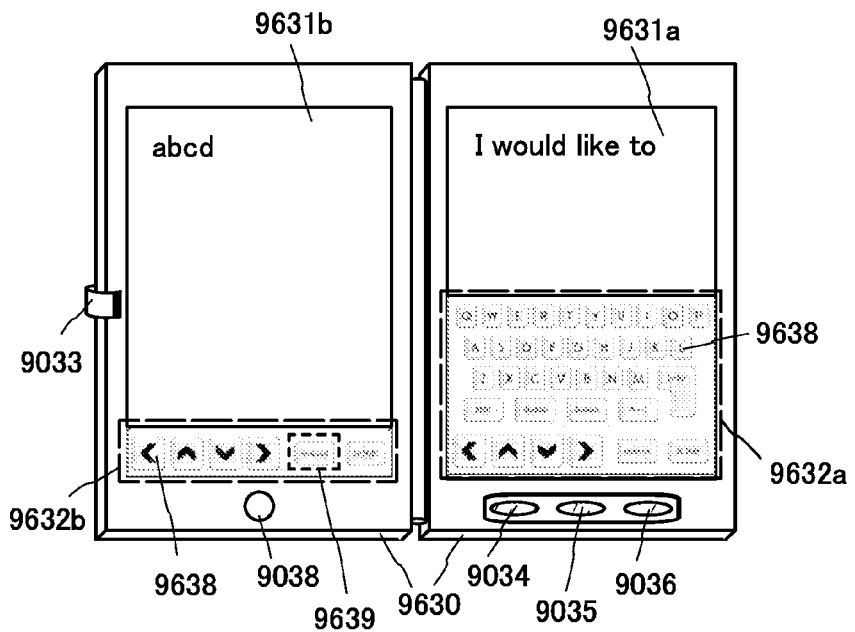
FIGS. 16A to 16C are diagrams showing electronic appliances each including power storage device.
Figure 16B:
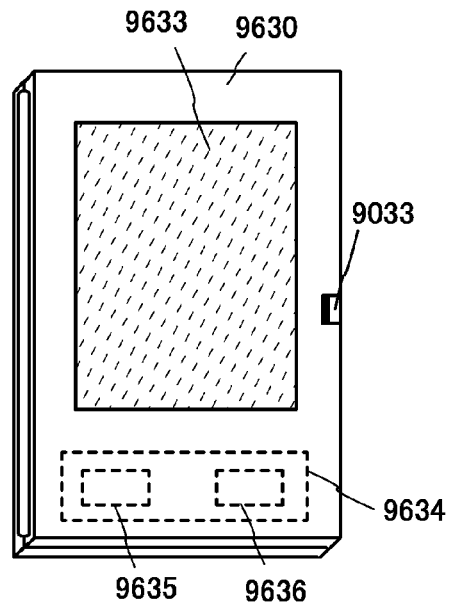

FIGS. 16A and 16B illustrate a tablet terminal that can be folded. In FIG. 16A, the tablet terminal is opened, and includes a housing 9630, a display portion 9631a, a display portion 9631b, a switch 9034 for switching display modes, a power switch 9035, a switch 9036 for switching to power-saving mode, a fastener 9033, and an operation switch 9038.

Part of the display portion 9631a can be a touch panel region 9632a and data can be input when a displayed operation key 9638 is touched. Although a structure in which a half region in the display portion 9631a has only a display function and the other half region has a touch panel function is shown as an example, the display portion 9631a is not limited to the structure. The whole region in the display portion 9631a may have a touch panel function. For example, the display portion 9631a can display keyboard buttons in the whole region to be a touch panel, and the display portion 9631b can be used as a display screen.

Similarly to the display portion 9631a, part of the display portion 9631b can be a touch panel region 9632b. A switching button 9639 for showing/hiding a keyboard of the touch panel is touched with a finger, a stylus, or the like, so that keyboard buttons can be displayed on the display portion 9631b.

Touch input can be performed in the touch panel region 9632a and the touch panel region 9632b at the same time.

The switch 9034 for switching display modes can switch the display between portrait mode, landscape mode, and the like, and between monochrome display and color display, for example. The switch 9036 for switching to power-saving mode can control display luminance to be optimal in accordance with the amount of external light in use of the tablet terminal which is detected by an optical sensor incorporated in the tablet terminal. Another detection device including a sensor for detecting inclination, such as a gyroscope or an acceleration sensor, may be incorporated in the tablet terminal, in addition to the optical sensor.

Note that FIG. 16A shows an example in which the display portion 9631a and the display portion 9631b have the same display area; however, without limitation thereon, one of the display portions may be different from the other display portion in size and display quality. For example, one display panel may be capable of higher-definition display than the other display panel.

The tablet terminal is closed in FIG. 16B. The tablet terminal includes the housing 9630, a solar cell 9633, a charge/discharge control circuit 9634, a battery 9635, and a DCDC converter 9636. In FIG. 16B, a structure including the battery 9635 and the DCDC converter 9636 is illustrated as an example of the charge/discharge control circuit 9634. The power storage device described in any of the above embodiments is used as the battery 9635.

Since the tablet terminal can be folded, the housing 9630 can be closed when the tablet terminal is not used. As a result, the display portion 9631a and the display portion 9631b can be protected; thus, a tablet terminal which has excellent durability and excellent reliability in terms of long-term use can be provided.

In addition, the tablet terminal illustrated in FIGS. 16A and 16B can have a function of displaying a variety of kinds of data (e.g., a still image, a moving image, and a text image), a function of displaying a calendar, a date, the time, or the like on the display portion, a touch-input function of operating or editing the data displayed on the display portion by touch input, a function of controlling processing by a variety of kinds of software (programs), and the like.

The solar cell 9633 provided on a surface of the tablet terminal can supply power to the touch panel, the display portion, a video signal processing portion, or the like. Note that a structure in which the solar cell 9633 is provided on one or two surfaces of the housing 9630 is preferable to charge the battery 9635 efficiently. When the power storage device described in any of the above embodiments is used as the battery 9635, there is an advantage of downsizing or the like.

The structure and the operation of the charge/discharge control circuit 9634 illustrated in FIG. 16B are described with reference to a block diagram in FIG. 16C. The solar cell 9633, the battery 9635, the DCDC converter 9636, a converter 9637, switches SW1 to SW3, and the display portion 9631 are shown in FIG. 16C, and the battery 9635, the DCDC converter 9636, the converter 9637, and the switches SW1 to SW3 correspond to the charge/discharge control circuit 9634 in FIG. 16B.

First, an example of the operation in the case where power is generated by the solar cell 9633 using external light is described. The voltage of power generated by the solar cell is raised or lowered by the DCDC converter 9636 so that the power has a voltage for charging the battery 9635. Then, when the power from the solar cell 9633 is used for the operation of the display portion 9631, the switch SW1 is turned on and the voltage of the power is raised or lowered by the converter 9637 so as to be a voltage needed for the display portion 9631. In addition, when display on the display portion 9631 is not performed, the switch SW1 is turned off and the switch SW2 is turned on so that charge of the battery 9635 may be performed.

Note that the solar cell 9633 is described as an example of a power generation means; however, without limitation thereon, the battery 9635 may be charged using another power generation means such as a piezoelectric element or a thermoelectric conversion element (Peltier element). For example, the battery 9635 may be charged with a non-contact power transmission module which is capable of charging by transmitting and receiving power by wireless (without contact), or another charging means may be used in combination.

Figure 16C:
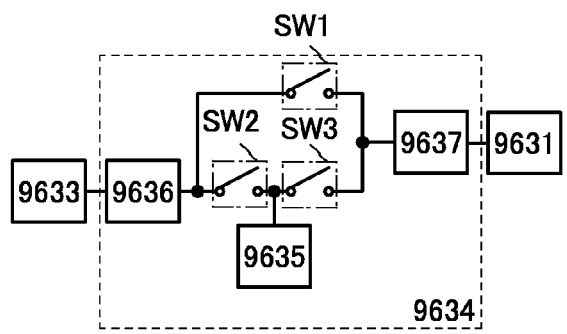

It is needless to say that an embodiment of the present invention is not limited to the electronic device illustrated in FIGS. 16A to 16C as long as the power storage device described in any of the above embodiments is included.

This embodiment can be implemented by being combined as appropriate with any of the above-described embodiments.

This application is based on Japanese Patent Application serial No. 2011-206054 filed with Japan Patent Office on Sep. 21, 2011, the entire contents of which are hereby incorporated by reference.

What is claimed is:

1. A negative electrode for a power storage device comprising:
    a current collector;
    a negative electrode active material structure over the current collector, the negative electrode active material structure comprising at least a first protrusion, a second protrusion, a third protrusion, and a fourth protrusion;
    a first bar over the first protrusion and the second protrusion; and
    a second bar over the third protrusion and the fourth protrusion,
    wherein the current collector comprises one selected from the group consisting of titanium, aluminum, and copper,
    wherein each of the first protrusion, the second protrusion, the third protrusion, and the fourth protrusion comprises an active material,
    wherein each of the first bar and the second bar comprises a conductive material, and
    wherein the conductive material comprises one selected from the group consisting of titanium, aluminum, and copper.

2. The negative electrode for a power storage device according to claim 1, wherein the negative electrode active material structure further comprises a common portion provided with the first protrusion and the second protrusion.

3. The negative electrode for a power storage device according to claim 2, wherein the first bar is oriented in a direction perpendicular to a direction in which the common portion is bent.

4. The negative electrode for a power storage device according to claim 1, wherein the current collector is in contact with the first protrusion and the second protrusion.

5. The negative electrode for a power storage device according to claim 4, wherein the first bar is oriented in a direction perpendicular to a direction in which the current collector is bent.

6. The negative electrode for a power storage device according to claim 1,
    wherein a plane orientation of the first protrusion and a plane orientation of the second protrusion are oriented in the same direction, or a crystal orientation of the first protrusion and a crystal orientation of the second protrusion are oriented in the same direction.

7. The negative electrode for a power storage device according to claim 1, wherein the first protrusion and the second protrusion include silicon.

8. A power storage device including the negative electrode according to claim 1.

9. A negative electrode for a power storage device comprising:
    a current collector;
    a negative electrode active material structure over the current collector, the negative electrode active material structure comprising at least a first protrusion, a second protrusion, a third protrusion, and a fourth protrusion;
    a first bar over the first protrusion and the second protrusion;
    a second bar over the third protrusion and the fourth protrusion; and
    a graphene covering at least side surfaces of the first protrusion and the second protrusion,
    wherein the current collector comprises one selected from the group consisting of titanium, aluminum, and copper,
    wherein each of the first protrusion, the second protrusion, the third protrusion, and the fourth protrusion comprises an active material,
    wherein each of the first bar and the second bar comprises a conductive material, and
    wherein the conductive material comprises one selected from the group consisting of titanium, aluminum, and copper.

10. The negative electrode for a power storage device according to claim 9, wherein a plane orientation of the first protrusion and a plane orientation of the second protrusion are oriented in the same direction, or a crystal orientation of the first protrusion and a crystal orientation of the second protrusion are oriented in the same direction.

11. The negative electrode for a power storage device according to claim 9, wherein the first protrusion and the second protrusion include silicon.

12. A power storage device including the negative electrode according to claim 9.

13. The negative electrode for a power storage device according to claim 9, wherein the graphene covers top surfaces of the first protrusion and the second protrusion.

14. A negative electrode for a power storage device comprising:
   a current collector;
   a negative electrode active material structure over the current collector, the negative electrode active material structure comprising at least a first protrusion, a second protrusion, a third protrusion, and a fourth protrusion;
   a first bar over the first protrusion and the second protrusion;
   a second bar over the third protrusion and the fourth protrusion; and
   a graphene covering side surfaces of the first protrusion and the second protrusion and a top surface of the first bar,
   wherein the current collector comprises one selected from the group consisting of titanium, aluminum, and copper,
   wherein each of the first protrusion, the second protrusion, the third protrusion, and the fourth protrusion comprises an active material,
   wherein each of the first bar and the second bar comprises a conductive material, and
   wherein the conductive material comprises one selected from the group consisting of titanium, aluminum, and copper.

15. The negative electrode for a power storage device according to claim 14, wherein a plane orientation of the first protrusion and a plane orientation of the second protrusion are oriented in the same direction, or a crystal orientation of the first protrusion and a crystal orientation of the second protrusion are oriented in the same direction.

16. The negative electrode for a power storage device according to claim 14, wherein the first protrusion and the second protrusion include silicon.

17. A power storage device including the negative electrode according to claim 14.

18. The negative electrode for a power storage device according to claim 1,
   wherein the first bar serves as a connecting bridge over the first protrusion and the second protrusion, and
   wherein the second bar serves as a connecting bridge over the third protrusion and the fourth protrusion.

19. The negative electrode for a power storage device according to claim 9,
   wherein the first bar serves as a connecting bridge over the first protrusion and the second protrusion, and
   wherein the second bar serves as a connecting bridge over the third protrusion and the fourth protrusion.

20. The negative electrode for a power storage device according to claim 14,
   wherein the first bar serves as a connecting bridge over the first protrusion and the second protrusion, and
   wherein the second bar serves as a connecting bridge over the third protrusion and the fourth protrusion.

21. The negative electrode for a power storage device according to claim 1, wherein the first bar is arranged in parallel with the second bar.

* * * * *